United States Patent [19]

Holt et al.

[11] Patent Number: 5,263,163
[45] Date of Patent: Nov. 16, 1993

[54] ARBITRATION AMONG MULTIPLE USERS OF A SHARED RESOURCE

[75] Inventors: Craig S. Holt, Canton; Joseph Keren-Zvi, Sharon, both of Mass.; Lloyd A. Hasley, Austin, Tex.

[73] Assignee: Codex Corporation, Mansfield, Mass.

[21] Appl. No.: 963,009

[22] Filed: Oct. 19, 1992

Related U.S. Application Data

[63] Continuation of Ser. No. 467,874, Jan. 19, 1990, abandoned.

[51] Int. Cl.⁵ .............................................. G06F 13/14
[52] U.S. Cl. .................................. 395/725; 395/550;
  395/325; 340/825.5; 364/DIG. 1; 364/228.1;
  364/229; 364/230; 364/240; 364/240.4;
  364/241.2; 364/241.4; 364/242.6; 364/242.8;
  364/271.2; 364/271.5
[58] Field of Search ............... 395/325, 725, 250, 200,
  395/550; 340/825.5

[56] References Cited

U.S. PATENT DOCUMENTS

| | | | |
|---|---|---|---|
| 3,710,351 | 1/1973 | Nakamura | 395/200 |
| 4,402,040 | 8/1983 | Evett | 395/325 |
| 4,463,445 | 7/1984 | Grimes | 395/325 |
| 4,467,418 | 8/1984 | Quinquis | 395/325 |
| 4,484,273 | 11/1984 | Stiffler et al. | 395/325 |
| 4,620,278 | 10/1986 | Ellsworth et al. | 395/325 |
| 4,633,394 | 12/1986 | Georgiou et al. | 395/650 |
| 4,701,756 | 10/1987 | Burr | 370/16 |
| 4,745,548 | 5/1988 | Blahut | 395/325 |
| 4,779,089 | 10/1988 | Theus | 395/325 |
| 4,785,394 | 11/1988 | Fischer | 395/425 |
| 4,787,033 | 11/1988 | Bomba et al. | 395/325 |
| 4,839,855 | 6/1989 | Van Driel | 395/550 |
| 4,875,158 | 10/1989 | Ashkin et al. | 395/275 |
| 4,881,195 | 11/1989 | Delong et al. | 395/725 |
| 4,897,833 | 1/1990 | Kent et al. | 340/625.5 |
| 4,908,749 | 3/1990 | Marshall et al. | 395/325 |
| 4,959,775 | 9/1990 | Yonekura | 395/325 |
| 4,964,034 | 10/1990 | Jaskowiak | 395/325 |
| 4,965,717 | 10/1990 | Cutts, Jr. et al. | 395/425 |
| 4,969,120 | 11/1990 | Azevedo et al. | 395/325 |
| 4,980,577 | 12/1990 | Baxter | 307/272.1 |

OTHER PUBLICATIONS

Mark Elderkin, Dr. Gary Nelson; COMMBUS A Backplane Bus and Package for Hybrid Communications Equipment; Feb. 16, 1988; pp. 1-21.

Edward C. Luczak; Global Bus Computer Communication Techniques; Dec. 1978; pp. 452-462.

Microprocessor Bus Structures; IEEE Standard Backplane Bus Specification for Multiprocessor Architectures: Futurebus; 1987; pp. 51-93.

Anthony S. Acampora; Michael G. Hluchyj; A New Local Area Network Architecture Using a Centralized Bus; Aug. 1984; pp. 12-21.

A. S. Acampora, M. G. Hluchyj, C. D. Tsao; A Centralized-Bus Architecture for Local Are Networks; Jun. 1983; pp. 932-938.

*Primary Examiner*—Michael R. Fleming
*Assistant Examiner*—Ayaz R. Sheikh
*Attorney, Agent, or Firm*—Darleen J. Stockley

[57] ABSTRACT

Arbitration is performed among a plurality of users for access to a shared resource in a system of the kind in which the users arbitrate by placing arbitration signals on a line and subsequently comparing their arbitration signals with a signal appearing on the line, by providing the users with independently operating clocks, and controlling the progression of the arbitration based on timing provided by the clock of at least one of the users. The progression of the arbitration thus does not depend upon a single master clock, or upon synchronizing the individual user clocks. Users that request access are assigned a first priority in the arbitration based at least on an access priority preassigned to the request for access and on whether the user is a member of a current group of users that is formed at a time during the arbitration when another group of users is empty, the current group including users that have been denied access as of that time; at least a portion of each user's arbitration signal is arranged as a multibit word having a value that represents the first priority, and each user that arbitrates for access places its multibit word in parallel on the path and determines whether it has won the arbitration by subsequently comparing its multibit word value with the value of a multibit word that appears on the path.

48 Claims, 19 Drawing Sheets

| USER | PRIORITY | TOURNAMENT (CYCLE 1 ONLY) | | | | | | | |
|---|---|---|---|---|---|---|---|---|---|
| | | 1 | 2 | 3 | 4 | 5 | 6 | 7 | 8 |
| 1 | P1 | 0 1 1 1 | 1 1 1 1 | 1 1 1 1 | ✓ | | | | |
| 2 | P1 | 0 1 1 1 | 1 1 1 1 | ✓ | | | | | |
| 3 | P1 | 0 1 1 1 | ✓ | | | | | | |
| 4 | P2 | 0 0 0 1 | 0 0 1 1 | 0 0 1 1 | 0 0 1 1 | 0 0 1 1 | 0 0 1 1 | ✓ | |
| 5 | P2 | 0 0 0 1 | 0 0 1 1 | 0 0 1 1 | 0 0 1 1 | 0 0 1 1 | ✓ | | |
| 6 | P1 | | 0 1 1 1 | 0 1 1 1 | 0 1 1 1 | ✓ | | | |
| 7 | P2 | | 0 0 0 1 | 0 0 0 1 | 0 0 0 1 | 0 0 0 1 | 0 0 0 1 | 0 0 0 1 | ✓ |
| ARBITRATION BUS | | 3 2 1 0 | 3 2 1 0 | 3 2 1 0 | 3 2 1 0 | 3 2 1 0 | 3 2 1 0 | 3 2 1 0 | |

✓ INDICATES WINNER OF PREVIOUS TOURNAMENTS

*FIG.9A*

| USER | PRIORITY | TOURNAMENT (CYCLE 1 ONLY) | | | | | | |
|---|---|---|---|---|---|---|---|---|
| | | 1 | 2 | 3 | 4 | 5 | 6 | 7 |
| 1 | P1 | 0111 | 1111 | 1111 | ✓ | | | |
| 2 | P1 | | 0111 | 0111 | 0111 | 1111 | 1111 | |
| 3 | P1 | 0111 | 1111 | ✓ | | | | |
| 4 | P1 | 0111 | | | 0111 | 1111 | ✓ | |
| 5 | P1 | | | 0111 | 0111 | ✓ | | |
| ARBITRATION BUS | | 3 2 1 0 | 3 2 1 0 | 3 2 1 0 | 3 2 1 0 | 3 2 1 0 | 3 2 1 0 | 3 2 1 0 |

✓ INDICATES WINNER OF PREVIOUS TOURNAMENTS

FIG. 9B

|  | CYCLE 2 | CYCLE 3 |
|---|---|---|
|  | A9–A5 | A4–A0 |
| USER | MSB | MSB |
| 0 | 00000 | 00000 |
| 1 | 00000 | 00001 |
| 2 | 00000 | 00011 |
| 3 | 00000 | 00111 |
| 4 | 00000 | 01111 |
| 5 | 00000 | 11111 |
| 6 | 00001 | 00000 |
| 7 | 00001 | 00001 |
| 8 | 00001 | 00011 |
| 9 | 00001 | 00111 |
| 10 | 00001 | 01111 |
| 11 | 00001 | 11111 |
| 12 | 00011 | 00000 |
| 13 | 00011 | 00001 |
| 14 | 00011 | 00011 |
| 15 | 00011 | 00111 |
| 16 | 00011 | 01111 |
| 17 | 00011 | 11111 |
| 18 | 00111 | 00000 |
| 19 | 00111 | 00001 |
| 20 | 00111 | 00011 |
| 21 | 00111 | 00111 |
| 22 | 00111 | 01111 |
| 23 | 00111 | 11111 |
| 24 | 01111 | 00000 |
| 25 | 01111 | 00001 |
| 26 | 01111 | 00011 |
| 27 | 01111 | 00111 |
| 28 | 01111 | 01111 |
| 29 | 01111 | 11111 |
| 30 | 11111 | 00000 |
| 31 | 11111 | 00001 |
| 32 | 11111 | 00011 |
| 33 | 11111 | 00111 |
| 34 | 11111 | 01111 |
| 35 | 11111 | 11111 |

*FIG. 10*

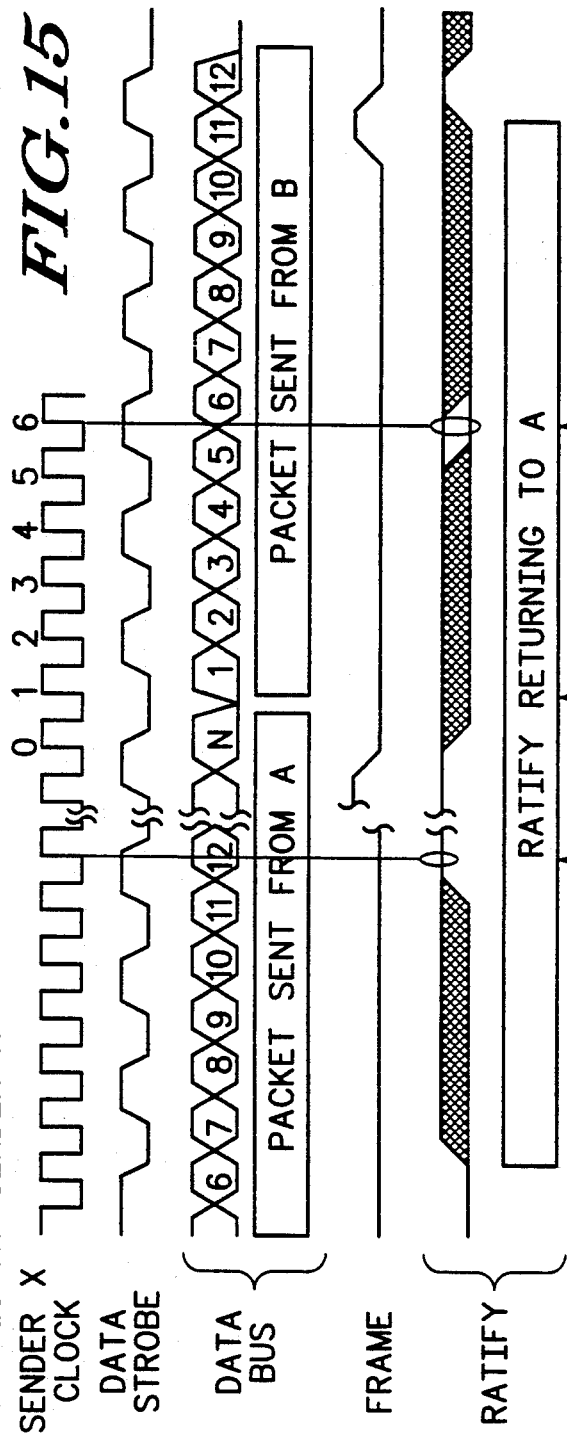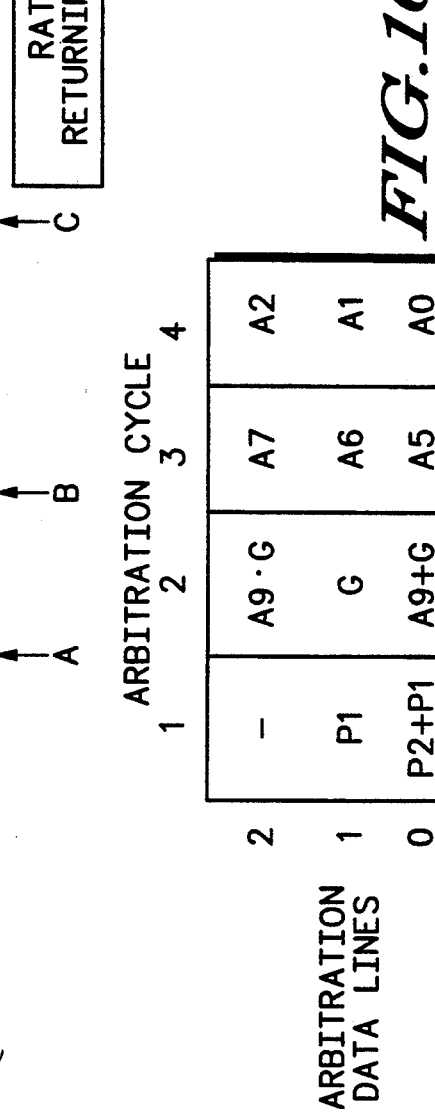

| USER | A9 | A7-A5 | A2-A0 |
|------|----|----|----|
| 0  | 0 | 0 0 0 | 0 0 0 |
| 1  | 0 | 0 0 0 | 0 0 1 |
| 2  | 0 | 0 0 0 | 0 1 1 |
| 3  | 0 | 0 0 0 | 1 1 1 |
| 4  | 0 | 0 0 1 | 0 0 0 |
| 5  | 0 | 0 0 1 | 0 0 1 |
| 6  | 0 | 0 0 1 | 0 1 1 |
| 7  | 0 | 0 0 1 | 1 1 1 |
| 8  | 0 | 0 1 1 | 0 0 0 |
| 9  | 0 | 0 1 1 | 0 0 1 |
| 10 | 0 | 0 1 1 | 0 1 1 |
| 11 | 0 | 0 1 1 | 1 1 1 |
| 12 | 0 | 1 1 1 | 0 0 0 |
| 13 | 0 | 1 1 1 | 0 0 1 |
| 14 | 0 | 1 1 1 | 0 1 1 |
| 15 | 0 | 1 1 1 | 1 1 1 |
| 16 | 1 | 0 0 0 | 0 0 0 |
| 17 | 1 | 0 0 0 | 0 0 1 |
| 18 | 1 | 0 0 0 | 0 1 1 |
| 19 | 1 | 0 0 0 | 1 1 1 |
| 20 | 1 | 0 0 1 | 0 0 0 |
| 21 | 1 | 0 0 1 | 0 0 1 |
| 22 | 1 | 0 0 1 | 0 1 1 |
| 23 | 1 | 0 0 1 | 1 1 1 |
| 24 | 1 | 0 1 1 | 0 0 0 |
| 25 | 1 | 0 1 1 | 0 0 1 |
| 26 | 1 | 0 1 1 | 0 1 1 |
| 27 | 1 | 0 1 1 | 1 1 1 |
| 28 | 1 | 1 1 1 | 0 0 0 |
| 29 | 1 | 1 1 1 | 0 0 1 |
| 30 | 1 | 1 1 1 | 0 1 1 |
| 31 | 1 | 1 1 1 | 1 1 1 |

ARBITRATION AMONG MULTIPLE USERS OF A SHARED RESOURCE

This is a continuation of application Ser. No. 07/467,874, filed Jan. 1, 1990 and now abandoned.

BACKGROUND OF THE INVENTION

The present invention relates in general to arbitration among users of a shared resource, such as a digital data bus, for access to the resource.

Users that share a data bus, such as PC boards connected by a common backplane within a system, typically compete for use of the data bus by participating in some form of arbitration. In one known arbitration scheme, each user having data to send on the shared data bus applies an arbitration signal to a wired-OR arbitration bus, and subsequently checks the resultant signal on the arbitration bus. If the resultant signal corresponds to that expected by the user, then that user wins the use of the shared data bus and is permitted to transfer a data message over it. Some arbitration schemes include a series of signal matching cycles, where the ultimate winner of the data bus is the user for which the resultant signal on the arbitration bus matches the expected signal in each of the cycles.

Such arbitration procedures generally require some form of synchronization between the users. Typically, synchronization is provided by having the users time the arbitration based on a system clock that simultaneously drives all users. Another alternative is to select one user to serve as a "master" during arbitration and have that user supply arbitration timing for all users. A third alternative is to synchronize the clocks by, for example, phase locking the individual user clocks. Propagation and other delays among a large number of users complicates clock synchronization among the users, and limits the maximum usable clock frequency, and thus the speed of the arbitration cycles and subsequent data bus transfers.

It is also known to award priority to users in the arbitration based on whether the users have previously been denied access, to promote fair allocation of the shared resource among the users.

SUMMARY OF THE INVENTION

A general aspect of the invention is arbitrating among a plurality of users for access to a shared resource in a system of the kind in which the users arbitrate by placing arbitration signals on a line and subsequently comparing their arbitration signals with a signal appearing on the line, by providing the users with independently operating clocks, and controlling the progression of the arbitration based on timing provided by the clock of at least one of the users.

Preferred embodiments include the following features.

At least one user is allowed to cause itself and other users to place the arbitration signals on the line and perform the comparison at times governed by the clock of the at least one user. Each user that arbitrates for the resource is capable of transmitting a first control signal at a time governed by the clock of that user to inform other users that it will place its arbitration signal on the line, and an arbitrating user refrains from transmitting the first control signal if it has already received the first control signal from another arbitrating user. An arbitrating user places its arbitration signal on the line when it either generates or receives the first control signal.

Due to, for example, propagation delays, an arbitrating user may successively receive multiple first control signals, but the arbitrating user is permitted to respond only to the first such control signal that the user receives. Each use that transmits the first control signal does so by asserting a pulse on a first control line (e.g., a wired-OR line connected between the users), and the arbitrating users respond to a single edge (such as the undriven to driven edge) of the pulse.

Each user that arbitrates for the resource is also capable of transmitting a second control signal to cause itself and other users to perform the comparison, and an arbitrating user refrains from transmitting the second control signal if it has already received the second control signal from another arbitrating user. A user performs the comparison when it either generates or receives the second control signal. An arbitrating user may successively receive multiple second control signals from multiple users (because of propagation delays between the users), but the user is permitted to respond only to the first such control signal that the user receives. The second control signal is a pulse asserted on a second control line, such as a wired-OR line connected between the users, and the arbitrating users respond to a single edge (e.g., the undriven to driven edge) of the pulse.

The arbitrating users count a predetermined number of clock cycles generated by their clocks after they receive or generate the first control signal; after reaching the predetermined number, a user transmits the second control signal if that user has not yet received the second control signal from another user. To prevent the time interval between the first and second control signals from decreasing for successive arbitrations, the predetermined number is different (e.g., one clock pulse less) for users that generate the first control signal than for users that receive the first control signal. An arbitrating user performs the comparison when it either generates or receives the second control signal and determines the result of the arbitration based on results of this comparison. The user that wins the arbitration for the shared resource (e.g., a data bus) is permitted access to the resource to, for example, transmit data over the bus.

Preferably, the arbitration includes a predetermined number of cycles in each of which at least one arbitrating user places its arbitration signal on the line and subsequently compares its arbitration signal with a signal appearing on the line to determine the result of the arbitration, and the progression of the arbitration within each cycle and from a first cycle to a subsequent cycle is controlled based on timing provided by the clock of at least one of the users. Each arbitrating user determines whether to proceed from one cycle to a second cycle based on results of the comparison made in the first cycle, and only one arbitrating user makes a determination to proceed in the final one of the cycles; such user is granted access to the shared resource. The clock that provides such timing may be that of different users in different cycles.

Each user that arbitrates for the resource is capable of transmitting a first control signal in each cycle at a time governed by the clock of that user to inform other users that it will place its arbitration signal on the line; a user refrains from transmitting the first control signal if it has received a first control signal from another user, and an arbitrating user places its arbitration signal on the line when it either generates or receives the first control signal. Each user that arbitrates for the resource is capable of transmitting a second control signal in each cycle to cause itself and other users to perform the comparison; an arbitrating user refrains from transmitting the second control signal if it has received a second control signal from another user; an arbitrating user performs the comparison when i either generates or receives the second control signal.

Each arbitrating user counts in each arbitration cycle a predetermined number of clock cycles generated by its clock after it receives or generates the first control signal and, after the predetermined number is reached, the user transmits the second control signal if it has not yet received the second control signal from another user. The transmission of the second control signal serves to start a second cycle of the arbitration and cause each user that has determined to proceed in the arbitration to place its arbitration signal on the line. Each arbitrating user that receives or generates the second control signal then counts a predetermined number of its clock cycles and, after the predetermined number is reached, transmits a third control signal if the user has not received the third control signal from another user. The arbitrating users each perform the comparison when they either generate or receive the third control signal, and determine a result of the second cycle of the arbitration based on this comparison.

The transmission of the third control signal also serves to start a third cycle in the arbitration and cause each user that has determined to proceed in the arbitration to place an arbitration signal on the line. Each arbitrating user that receives or generates the third control signal counts a predetermined number of cycles of its clock and, after reaching the predetermined number, transmits a fourth control signal if the user has not received the fourth control signal from another user. The arbitrating users each perform the comparison when they either generate or receive the fourth control signal and determine a result of the third cycle of the arbitration based on the comparison.

There may be any number of arbitration cycles. In one embodiment, there are three cycles and the fourth control signal serves to start a subsequent arbitration. In another embodiment, there are more than three cycles and the fourth control signal serves to start the fourth cycle in the arbitration.

Preferably, the arbitration process includes multiple arbitrations, successively performed, and the progression of each arbitration and progression from one arbitration to a second arbitration is controlled based on timing provided by the clock of at least one of the plurality of users. The clock that provides the timing may be that of different users for different arbitrations. Each user checks the arbitration line at the conclusion of an arbitration and does not proceed to the next arbitration if the line is idle. At least one user in each arbitration determines itself the winner of the arbitration based on the comparisons that are made, and that user is allowed access to the resource. The winning user signals other users if it detects that another arbitration is occurring while the winning user is using the resource, and the winning user releases this signal when it has finished using the resource. The users to suspend arbitration while the signal from the winning user is pending, and resume arbitration when the signal is released.

Where the shared resource is a data path, the path preferably comprises a bus that includes multiple data lines; the winning user transmits a strobe and data to at least one destination user over a portion of the data lines using a common driver, and the destination users receive the strobe and data over that portion of said data lines via a common receiver, whereby skew between the data and said strobe is reduced.

Each destination user sends a first signal to the winning user at a first predetermined time after the destination user begins to receive the data, and the destination user sends a second signal after a second predetermined time interval (both of which times are determined by counting a predetermined number of cycles of its clock) if the destination user determines that correct data was received. The winning user monitors the signal from the destination user (or users) and determines that an error has occurred if the winning user does not observe the second signal within a predetermined time (also determined by counting a predetermined number of cycles of its clock). The first and second signals are sent over a wired-OR line having an undriven state interconnected between the users; the first signal comprises asserting this line to a driven state, and the second signal comprises releasing said line to the undriven state.

The progression of the arbitration does not depend upon a single master clock, or upon synchronizing the individual user clocks. The users perform the arbitration using their independent clocks, which should be (but need not be) at approximately the same frequency. The arbitration technique is thus extremely fault tolerant—a malfunction of one user's clock affects only that user, while the remaining users are free to proceed with the arbitration using their independent clocks—compared with prior schemes in which arbitration timing was furnished by a system clock or by the clock of one "master" user. Also, because no one user serves as the "master" during arbitration, there is no need to initially determine which user will function as the master and thus, at least initially, supply arbitration timing for the other users. Nor must failures of such a master user be dealt with (e.g., by choosing another user to serve as the master).

Another general aspect of the invention is arbitrating among a plurality of users for access to a shared resource in a system of the kind in which each user arbitrates for access by placing an arbitration signal on a path interconnecting the users and subsequently comparing its arbitration signal with a signal appearing on the path to determine if the user has won the arbitration, by assigning a first priority to each user that requests access in the arbitration based at least on an access priority preassigned to the request for access and on whether the user is a member of a current group of users that is formed at a time during the arbitration when another group of users is empty, the current group including users that have been denied access as of that time; at least a portion of each user's arbitration signal is arranged as a multibit word having a value that represents the first priority, and each user that arbitrates for access places its multibit word in parallel on the path and determines whether it has won the arbitration by subsequently comparing its multibit word value with the value of a multibit word that appears on the path.

Preferred embodiments include the following features.

Each user's multibit word is arranged to have a value such that users belonging to the current group will have a higher first priority in the arbitration than users that have the same preassigned priority but that are not members of the current group. This assures (within a subset of users whose access requests have the same preassigned priority) that users previously denied access will be served before later-requesting users.

The arbitration comprises a predetermined number of cycles, with each user that arbitrates in a first one of the cycles determining whether to proceed to arbitrate in the next cycle based on results of the comparison made in the first cycle; each user that proceeds to arbitrate in the next cycle places a second multibit word in parallel on the path and repeats the comparing and determining steps. Each user's second multibit word may be different from the multibit word produced by that user during the first cycle. In one embodiment, during at least one of the cycles, each user places on the path a multibit word that represents an identification of the user in the system and has a value that represents a second preassigned access priority related to the identification. These multibit words are preferably binary words arranged to have marching ones values according to the respective identification of the users. In one embodiment, each user's multibit word that represents identification has a value based at least in part on whether the user is a member of the current group.

The invention provides a fast and effective means of controlling the allocation of the shared resource among the users. This allows a large number of users, asynchronous to one another, to use the resource.

Other features and advantages of the invention may become apparent from the following detailed description, and from the claims.

DESCRIPTION OF THE PREFERRED EMBODIMENTS

A brief description of the drawings is as follows.

Figure 8:
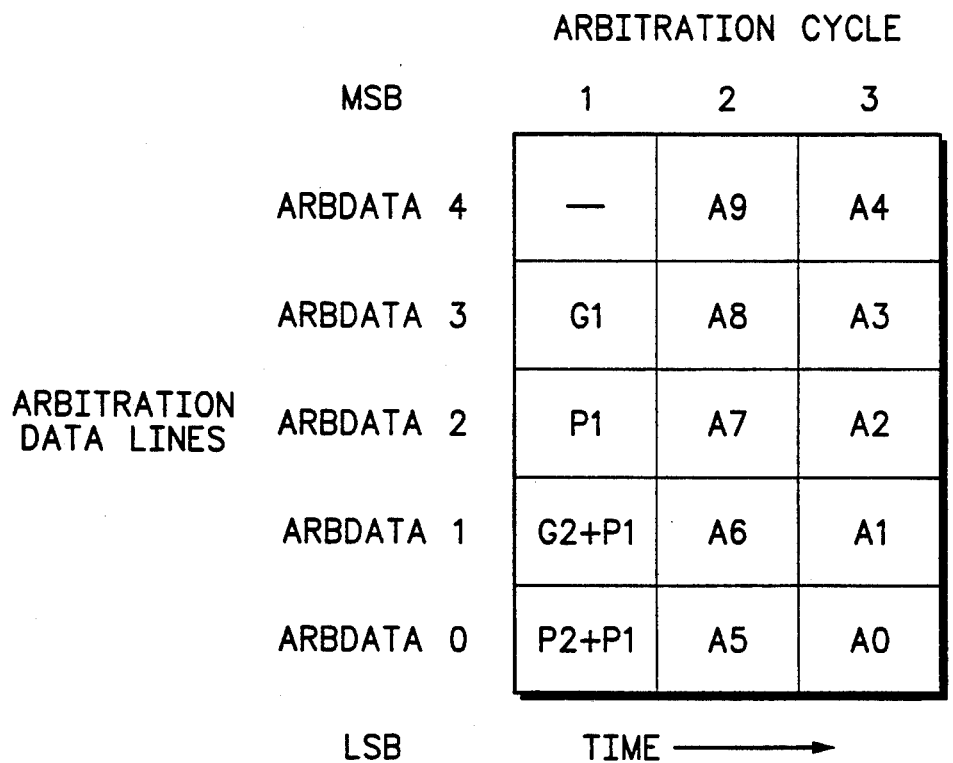
FIG. 8 shows an assignment of arbitration code bits corresponding to a 3-cycle, 5-wire, 2-priority arbitration tournament of FIG. 4.

FIG. 9 consist of FIGS. 9A and 9B shows the first cycle of each of seven tournaments of the 3-cycle, 5-wire, 2-priority tournament of FIG. 8.

Figure 1:
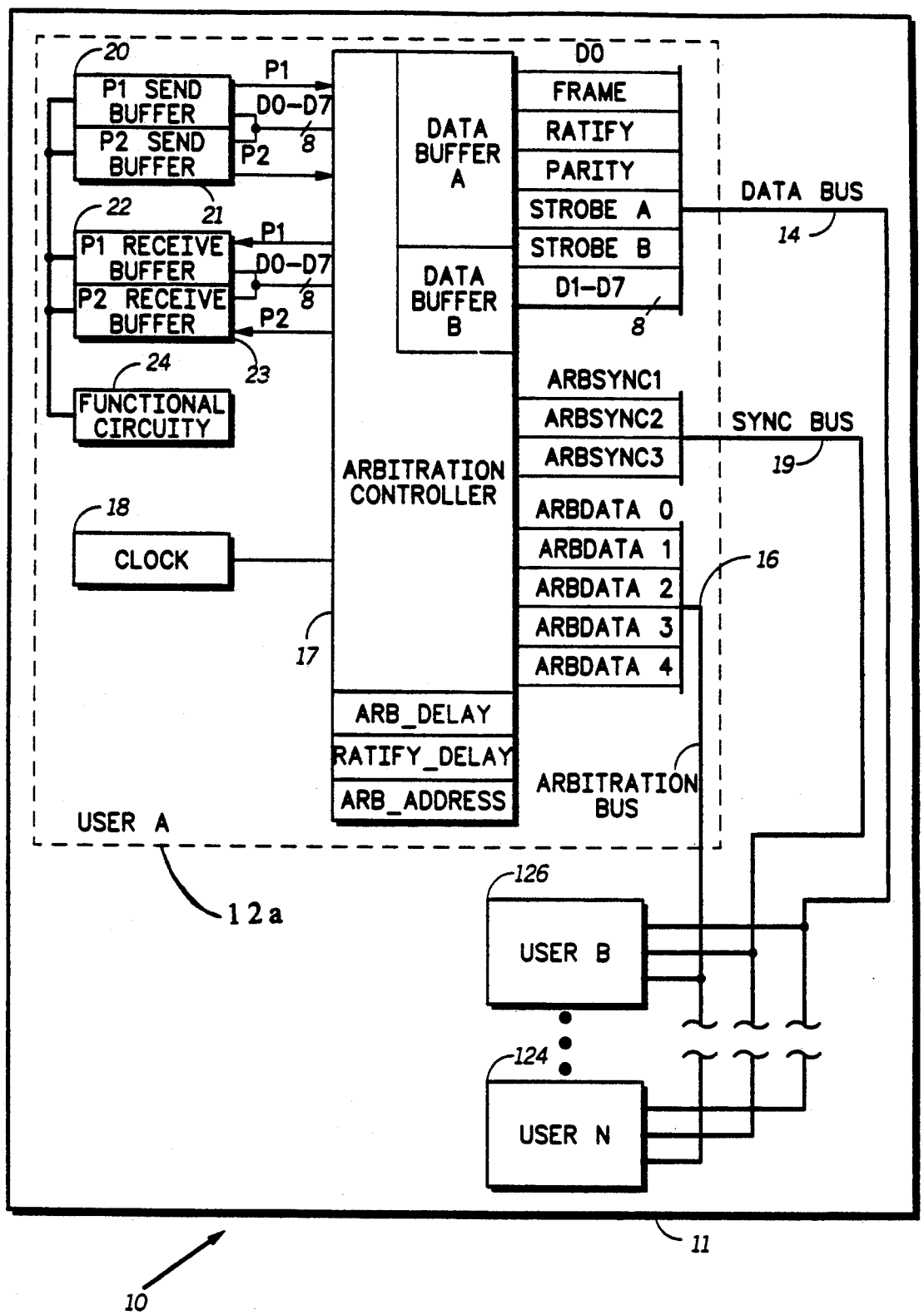
FIG. 1 is a block diagram of a digital system in which multiple users arbitrate for use of a common data bus.
Figure 4:
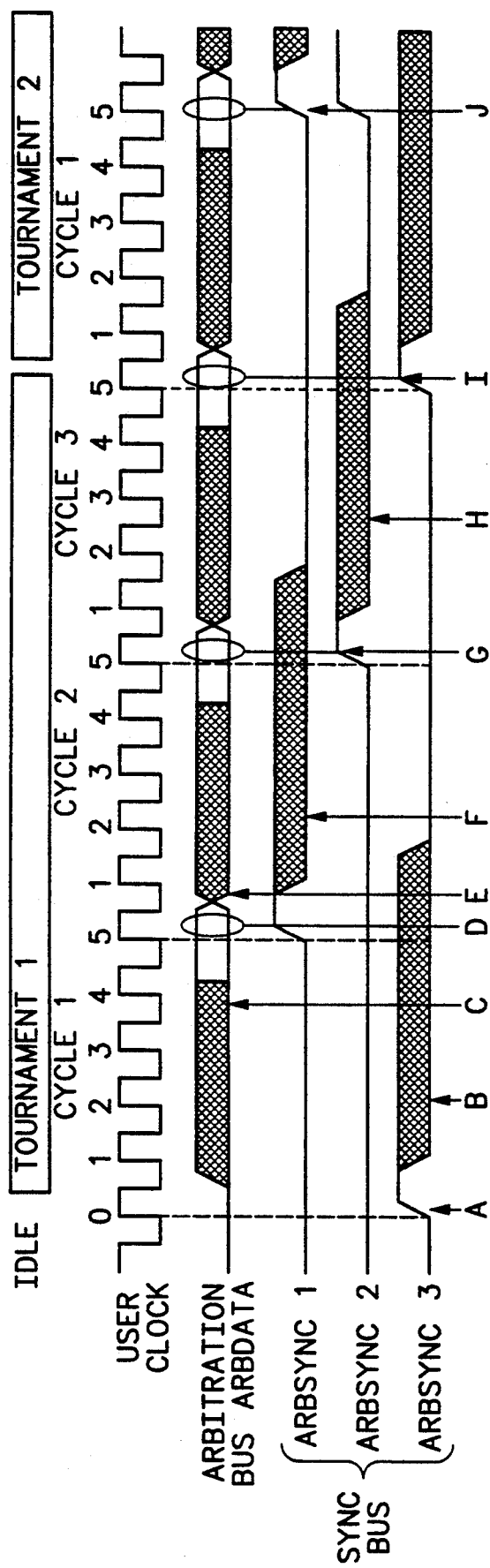
FIG. 4 is a timing diagram showing a 3-cycle arbitration tournament among users of FIG. 1.

FIG. 10 illustrates an arbitration address code assignment among the users of FIG. 1 for the 3-cycle, 5-wire, 2-priority tournament of FIG. 4.

Figure 11:
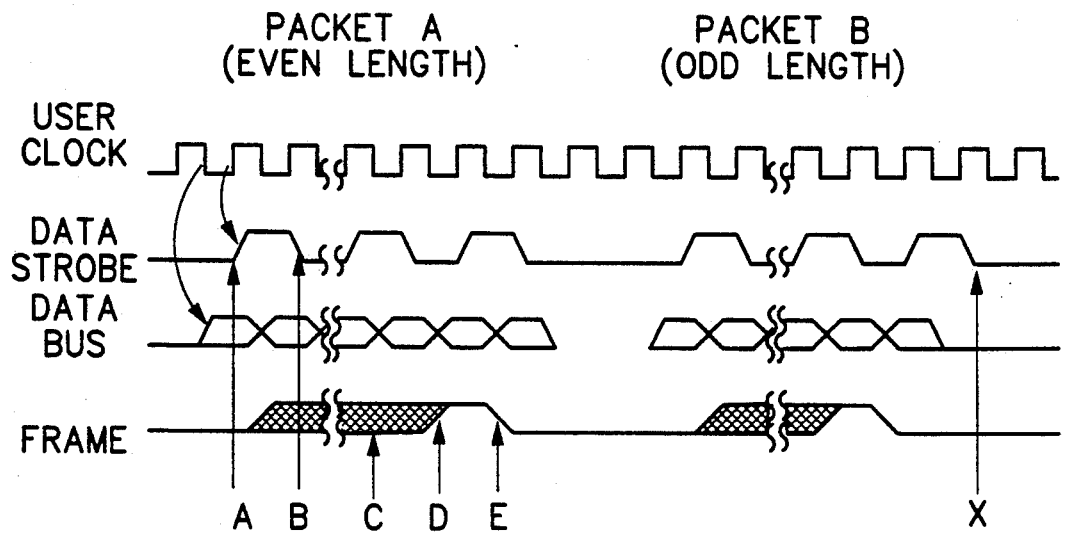

FIG. 11 is a timing diagram showing the sequence of events for a data transfer over the data bus of FIG. 1.

Figure 12:
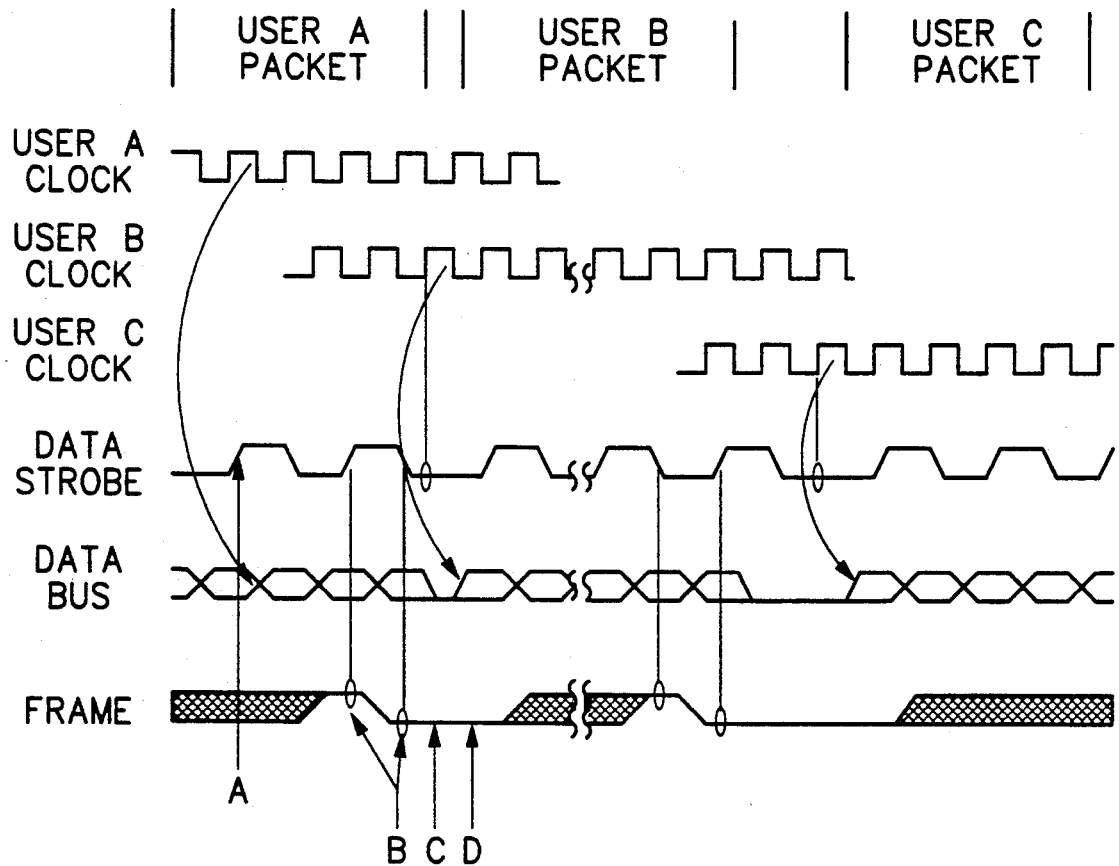

FIG. 12 is a timing diagram showing the passing of data bus control among sequential users of the data bus of FIG. 1.

Figure 13:
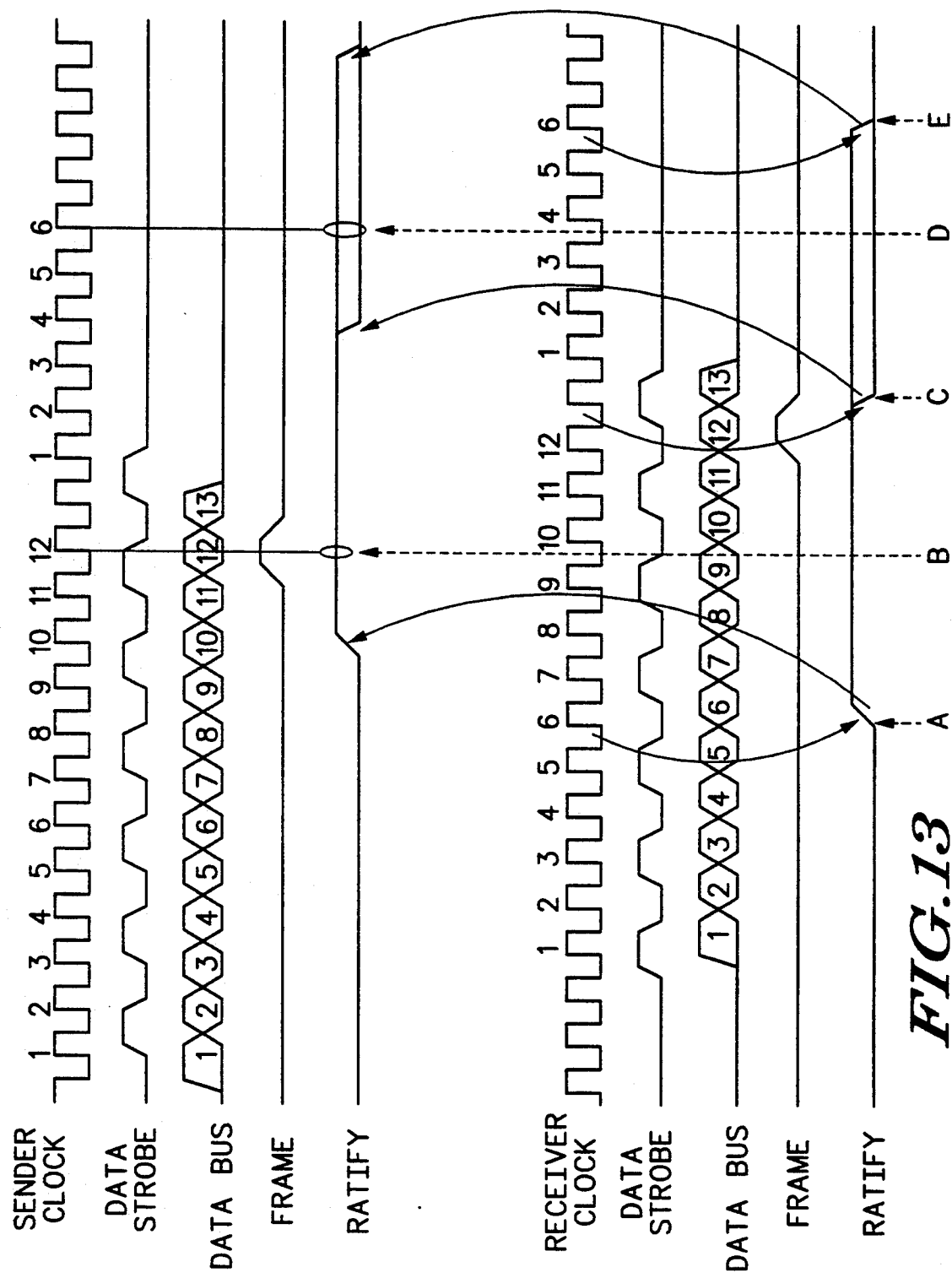
Figure 14:
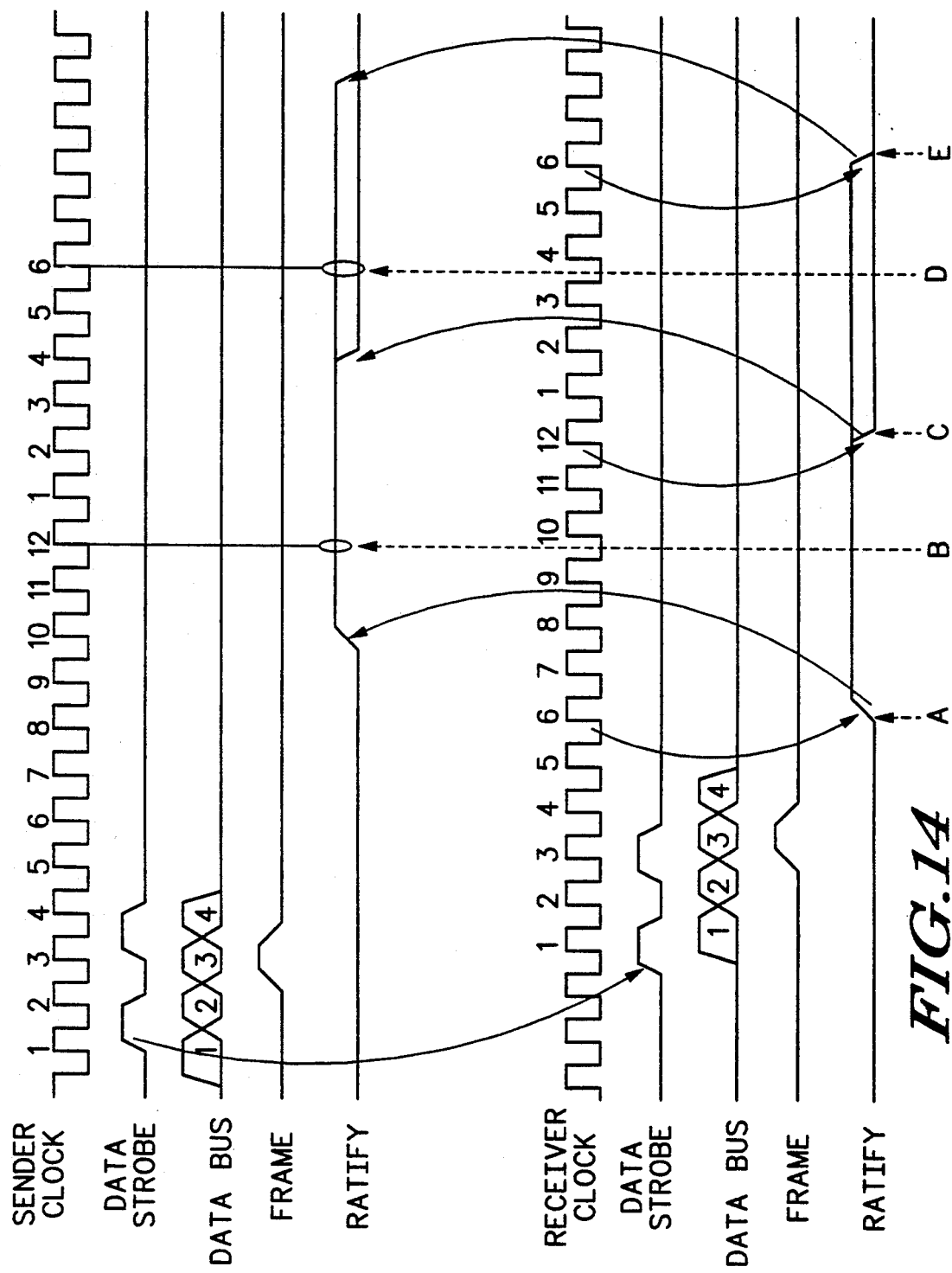

FIGS. 13 and 14 are timing diagrams showing the data ratify protocol used with data transfers over the data bus of FIG. 1.

FIG. 15 is a timing diagram showing the ratify protocol timing of FIGS. 13 and 14 between sequential users of the data bus of FIG. 1.

FIG. 16 is a chart showing a possible assignment of arbitration code bits corresponding to a 4-cycle, 3-wire, 2-priority arbitration tournament.

FIG. 17 depicts an arbitration address code assignment among the users of FIG. 1 for the 4-cycle, 3-wire, 2-priority arbitration tournament of FIG. 16.

Figure 18:
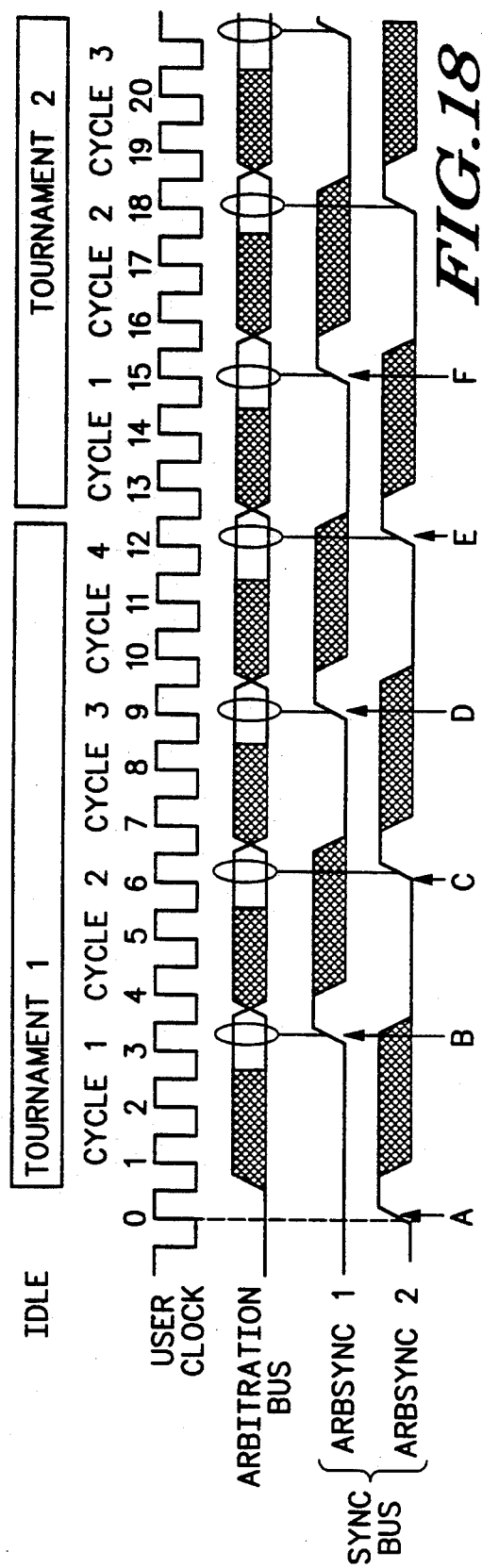

FIG. 18 is a timing diagram of the 4-cycle arbitration tournament of FIG. 16.

Figure 19:
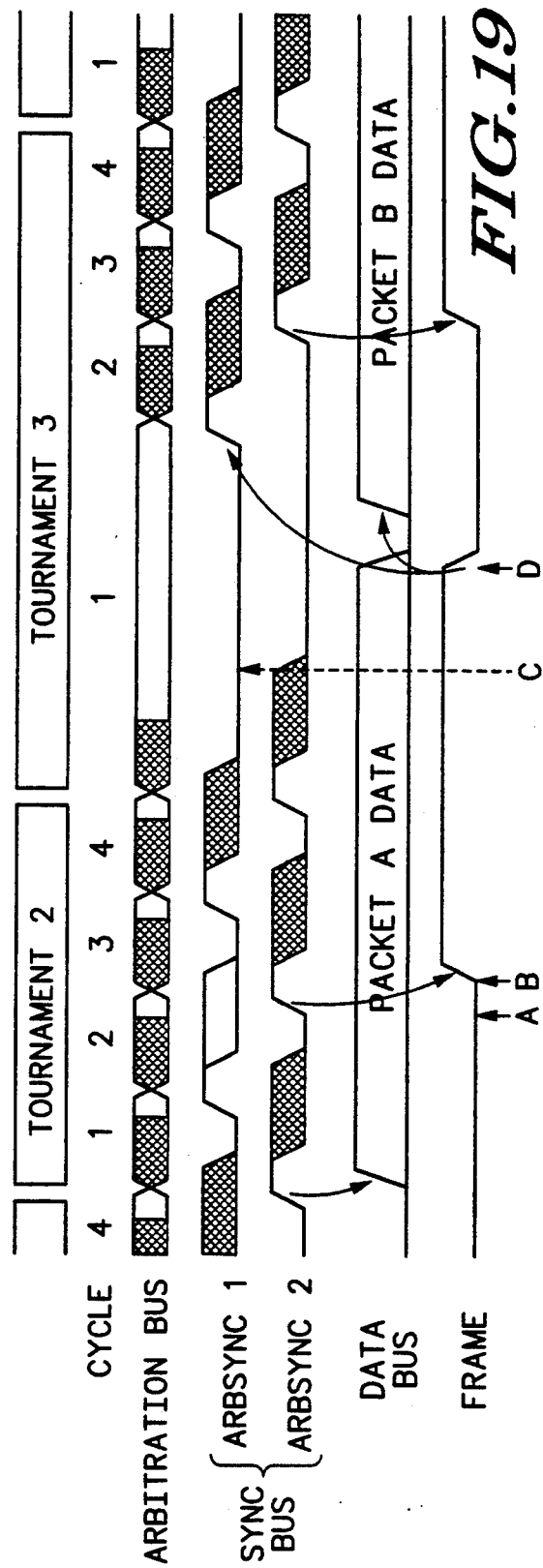

FIG. 19 is a timing diagram illustrating the suspension of successive arbitration tournaments of FIG. 18.

STRUCTURE AND OPERATION

Referring to FIG. 1, a digital system 10 includes multiple users 12a–12n, which for example are PC (printed circuit) boards disposed in a cardcage 11 and which communicate via a backplane 13. Digital system 10 employs arbitration and synchronization (discussed in detail below) among its users for access to a shared data bus 14 in the backplane. Data bus 14 is a multi-line bus comprising data lines (D0–D7), data strobe lines (STROBE A, STROBE B), a data ratify line (RATIFY), and a data frame line (FRAME). Digital data is transferred between users 12a–12n over the data bus 14 in the form of data packets, as discussed below.

Data is sent by an individual user 12a–12n over data bus 14 after that user has gained access to the data bus by means of arbitration with the other users 12a–12n. Arbitration takes place in a "tournament" which comprises a series of arbitration cycles. Only a single user 12a–12n will survive all the arbitration cycles in a given tournament to become the "winner" of that tournament, and thereby become the next user in line to access the data bus 14 and send its data packet.

Arbitration bus 16 is a multi-line digital bus running between all users 12a–12n. Each line of the arbitration bus 16 (ARBDATA0 through ARBDATA4) is driven by the users 12a–12n as a wire-ORed data bit, allowing each arbitrating user to assert an individual multi-bit arbitration code (ARB CODE) on the bus, as described below. Thus, a single resultant multi-bit arbitration (ARBDATA) code appears on the arbitration bus 16 dependent on the bit-wise wired-OR relationship of all asserted user arbitration codes.

Sync bus 19 is a multi-line digital synchronization control bus carrying arbitration synchronization information between all users 12a–12n. Each line of sync bus 19 (ARBSYNC1, ARBSYNC2 and ARBSYNC3) is driven by the users as a wired-OR control signal, allowing more than one user to simultaneously assert the same sync bus line. Each sync bus line carries an arbitration synchronization signal used to synchronize and control the users' assertion and readback of arbitration codes on arbitration bus 16, as described below.

Each user 12a–12n contains its own internal user clock 18. The user clocks 18 are independent and plesiosynchronous—they are very close to a predetermined frequency but are not synchronized with each other or with a system clock over a bus between the clocks. Each user 12a–12n bases its arbitration cycle timing on its own internal clock 18, with synchronization between users occurring only by means of the sync bus 19 signals. Similarly, data transfer timing is synchronized between users by means of the data strobe signal lines (i.e., STROBE A and STROBE B) of data bus 14.

Each user has a pair of send buffer circuits 20 and 21 that receive data from the users' functional circuit 24, which for instance may be a microprocessor, signal processor, or other electronic circuit. Send buffer circuits 20 and 21 each constructs data packets comprising the data to be transferred from the user's functional circuit 24 to a destination user and the address of the destination user. Additionally, each send buffer 20, 21 assigns its priority to each packet as determined by the functional circuit's decision to route the data to that particular send buffer. Send buffer 20 assigns each packet a high priority "P1" status, while send buffer 21 assigns each packet a low priority "P2" status. Once packet construction is completed, send buffer 20 or 21 signals its arbitration controller 17 to begin arbitrating for the data bus 14. In response, arbitration controller 17 enters arbitration for the data bus 14 with the other users 12a-12n that also have data packets ready to send. Arbitration proceeds as described below until each user 12a-12n with data to send has accessed data bus 14 and sent its data.

Each user 12a-12n continually monitors data bus 14 and responds to recognition of its own address in a transmitted data packet on the data bus by accepting the packet and asserting the data bus 14 data ratify line, as discussed below. The receiving target user routes the accepted data packet to either of its receive buffers 22 or 23 as determined by the packet's P1 or P2 priority status. Receive buffer 22 accepts P1 priority packets, while receive buffer 23 accepts P2 priority packets. The received data is Referring to FIG. 2, a sequence of overlapping events (arbitration, data transfer and ratification) is shown for five data packet transfers between users 12a-12n. In general, a data packet transfer over data bus 14 involves three phases: arbitration, data transfer, and ratification. The arbitration phase (called a "tournament") of a given data transfer cycle includes a series of arbitration cycles (e.g., three cycles or four cycles) conducted among the users who have data ready to send on data bus 14. The arbitrating user that wins, e.g., tournament 1 is permitted to send the next data packet over data bus 14. Data transfer 1 begins immediately following tournament 1 because (in this example) no users are currently using data bus 14. The user 12a-12n that wins tournament 1 sends its data packet over data bus 14 to the user addressed to receive it. Data transfer 1 lasts until the entire data packet has been transferred over the data bus. Ratification 1 begins during data transfer 1 with the receiving user acknowledging erroneous or errorless receipt of the packet to the sending user by asserting the data bus 14 ratify line as described below. Ratification 1 ends some time after data transfer 1 because the receiving user must have captured the entire data packet before signaling the sending user of the erroneous or errorless receipt of the data.

For some packets, the data transfer phase is longer than the time needed to arbitrate for the next sender. For example, data transfer 1 continues until after the conclusion of tournament 2. It is necessary to avoid the possibility of two tournaments occurring during the same data transfer, because this would lead to two winners waiting for cessation of activity on data bus 14 to begin what would be conflicting data transfers. Consequently, the users 12a-12n are allowed to start only one tournament during a given data transfer. This is accomplished using the FRAME line in data bus 14, as discussed below. Therefore, while tournament 2 is allowed to commence immediately following tournament 1, the users 12a-12n must wait to start tournament 3 until data transfer 1 ends. Also, the user 12a-12n that wins tournament 2 must wait for data transfer 1 to be completed before beginning data transfer 2. Hence, the winner of tournament 2 monitors data bus 14 for cessation of activity and then begins data transfer 2. Ratification 2 follows data transfer 2 in the same manner described above for ratification 1. The timing of ratification is such that no adjacent ratifications will overlap (although they may overlap adjacent data transfers).

Typically, a tournament is shorter in duration than the data transfer cycle during which it occurs. This is so because a tournament comprises only a few arbitration cycles, each only a few clock pulses in duration, while a data transfer typically involves the transmission of a large number of data words over a corresponding number of clock cycles. However, sometimes relatively small data packets containing only a few bytes of data (e.g., the packet sent in data transfer 2) are transmitted. As a result, the next tournament, e.g., tournament 3, exceeds the previous data transfer 2 in duration. This leads to some degree of idleness for data bus 14 between data transfers 2 and 3 because data transfer 3 cannot begin until tournament 3 has been completed (because no winner has yet been assigned to access the data bus for data transfer 3).

A tournament may begin at any time as long as there is no possibility of conflict between two tournament winners waiting for data bus 14. For example, tournament 4 begins during data transfer 3 as soon as there is at least one user (other than the user currently sending data) requiring access to data bus 14. Accordingly, the winner of tournament 4 waits for data transfer 3 to conclude before beginning data transfer 4.

Another cause of data bus 14 idleness is the start of a tournament shortly before the current data transfer is complete. For example, tournament 5 begins just prior to the end of data transfer 4, causing data bus 14 to remain idle after data transfer 4 ends until the winner of tournament 5 can be determined and that user begins data transfer 5.

Arbitration Timing

Figure 3A:
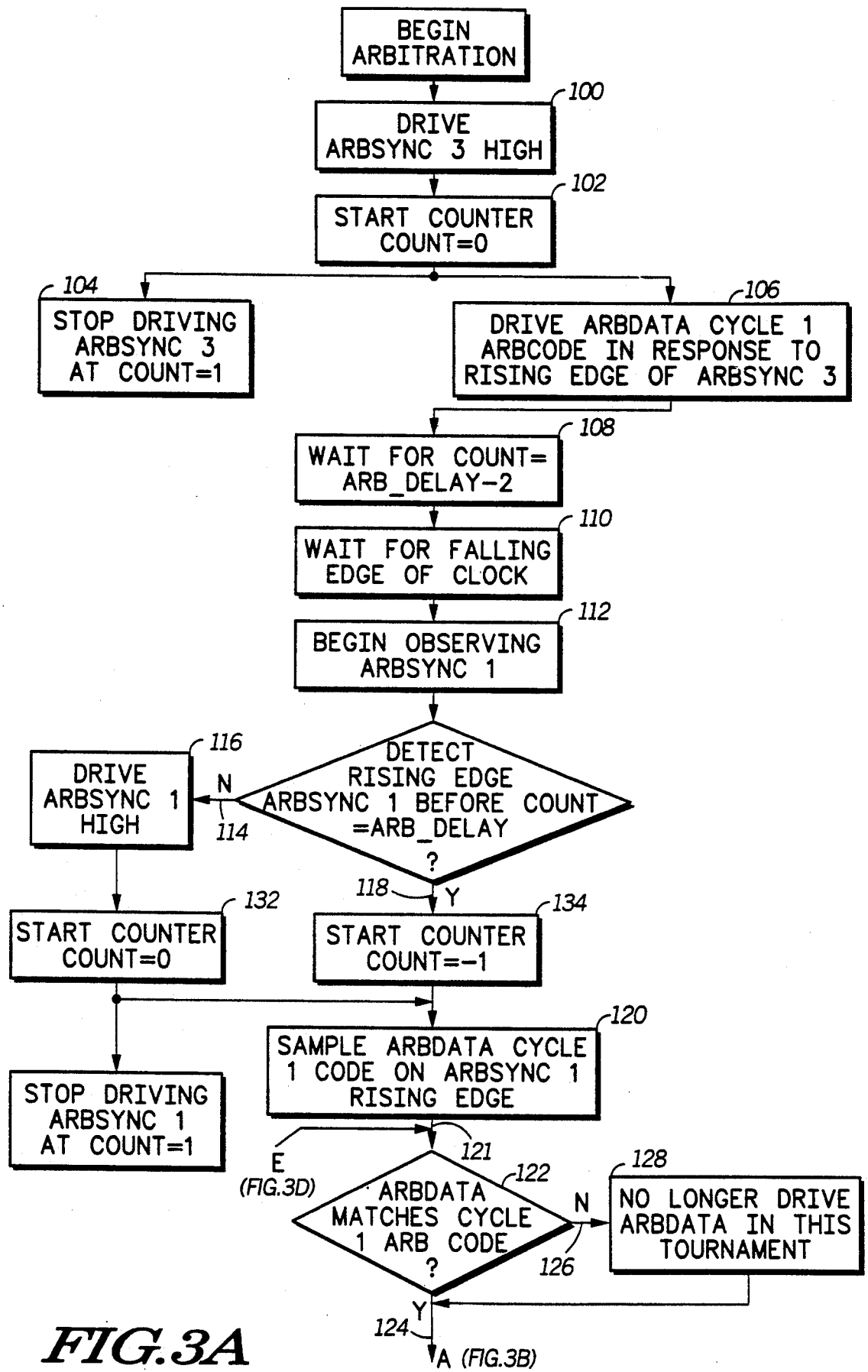
FIGS. 3a, 3b, 3c and 3d are flow charts showing the sequence of events during arbitration among users for the data bus of FIG. 1.

Referring to FIGS. 3a and 4, individual users 12a-12n running on individual non-synchronous user clocks 18, coordinate the application and readback of arbitration codes (ARBDATA) on arbitration bus 16 for a three-cycle tournament in the following manner. The three wired-OR lines of sync bus 19 and the rising edges of their respective signals, ARBSYNC1, ARBSYNC2, and ARBSYNC3, are used to coordinate the tournament. So-called "wired-OR" lines have a quiescent or undriven state when no user is driving the line, and a driven or asserted state when one or more users drive the line. The undriven-to-driven edges of these signals are used for arbitration because applicants have found that the other edges (i.e., driven-to-undriven) of the signals produce more reflections on the wired-OR lines which interfere with efficient arbitration. Thus a single edge of the ARBSYNC signals is used. In the examples shown in the figures, the lines are quiescently at a logic low and are driven to a logic high; thus, the rising edge is used. But normally high lines, driven to a logic low, could also be employed, in which case the falling edges would be used.

In the example illustrated by FIGS. 3a and 4, it is assumed that initially no users 12a-12n are attempting to arbitrate. When a user (e.g., user 12a) determines from its send buffer 20 or 21 that it has a data packet to send on data bus 14, it asserts a pulse on ARBSYNC3 (100) at a rising edge of its internal user clock 18 (time A). The rising edge of this pulse indicates to all users that this is the beginning of arbitration cycle 1. The ARBSYNC3 pulse is one clock period long, and thus is terminated when a counter in user 12a (initialized (102) at 0) counts one cycle (104) of the user clock 18 of user 12a. Each user 12a-12n includes a watchdog timer which forces the user to release an ARBSYNC signal (i.e., allow the signal to become a logic 0) if the user holds the ARBSYNC signal high for a predetermined time. This prevents a malfunctioning user clock 18 from disrupting arbitration.

Upon receiving the rising edge of the pulse on ARBSYNC3, all other users 12a-12n are prevented from generating their own ARBSYNC3 pulses. If two or more users 12a-12n become ready to arbitrate at about the same time it is possible that these users will each assert a pulse on ARBSYNC3 before having a chance to observe the rising edge from the other. The appearances of multiple pulses on the ARBSYNC3 line is of no consequence because each user 12a-12n responds only to the first detected rising edge of the pulse ARBSYNC3.

Logic delays and transmission line effects may cause the ARBSYNC3 pulses to appear as one pulse or as a sequence of pulses on the ARBSYNC3 line (during the period shown as time B). The exact shape of the ARBSYNC3 signal is not important, because each user responds only to the rising edge of the first ARBSYNC3 pulse it sees. Upon receiving this edge, every user 12a-12n that has a data packet ready to send applies its cycle 1 ARBDATA code (ARB CODE 1)(106), discussed below, on arbitration bus 16. Only users 12a-12n that have a data packet ready when they observe the rising edge of ARBSYNC3 may participate in this tournament (tournament 1). Note that each user 12a-12n drives the arbitration bus 16 with its cycle 1 ARBDATA code in response to the ARBSYNC3 rising edge, which need not be (and often is not) synchronous with its own internal user clock 18. The cycle 1 ARBDATA code is driven by each user during time period C. Non-participating users 12a-12n continue to monitor the sync bus 19 signals to keep track of arbitration cycles and detect the beginning of the next tournament (tournament 3), but they may not participate in the current tournament by driving either the arbitration bus 16 or sync bus 19 signals.

Once a positive edge has been generated on ARBSYNC3, all users 12a-12n wait for arbitration bus 16 to stabilize before attempting to read ARBDATA (106). A latency period (time A to time D) is built into each user as a delay between the rising edge of ARBSYNC3 (100), as seen by the user, and generation of the next ARBSYNC pulse (ARBSYNC1), which will cause reading of ARBDATA. In the worst case this delay compensates for ARBSYNC3 to propagate down sync bus 19 to a far-end user, and for that far-end user to apply its ARBDATA to arbitration bus 16 in response. Delay is also required for the far-end user ARBDATA to propagate back across the arbitration bus 16 to all users. A standard user clock delay is programmed into a register (ARB_DELAY) in each arbitration controller 17 (FIG. 1) to compensate for this worse case logic and transmission line delay. The delay is 5 clock cycles in the examples shown in FIGS. 4, 5, and 6. Each user that asserts ARBSYNC3 begins to count (102) positive edges of its own user clock 18 immediately after asserting the ARBSYNC3 pulse (100), which is equivalent to starting the count with a value of 0 (102) (i.e., the first rising edge of the user clock 18 after asserting ARBSYNC3 produces a count of 1). Every other arbitrating user, upon receiving the initial positive edge of ARBSYNC3, waits for the next rising edge of its own user clock 18 before it begins counting, which for such users is the equivalent of starting the count with a value of −1 (i.e., the first rising edge of the user clock after receiving ARBSYNC3 produces a count of 0).

Each user captures the ARBDATA value on arbitration bus 16 on the rising edge of the first ARBSYNC1 pulse it observes (time D). The state of the ARBSYNC1 line when a user 12a-12n reaches its ARB DELAY count determines whether or not that user asserts a pulse on ARBSYNC1. One and one-half clock counts before the user clock count reaches the ARB_DELAY value (i.e., on the negative edge of the internal user clock 18 after the count reaches ARB_DELAY-2, which is 3 cycles in this example) (108), the user begins observing (112) the ARBSYNC1 line (110). If the user's clock count then reaches the terminal ARB DELAY value and ARBSYNC1 remains low (114), then the user asserts a pulse on ARBSYNC1 for one clock cycle at time D (116, 132, 133). If, on the other hand, a high level on ARBSYNC arrives while the user is observing the ARBSYNC1 line (118), then the user refrains from asserting a pulse on the ARBSYNC1 line.

The leading edge of the pulse on ARBSYNC1 triggers each user to capture (120) the ARBDATA code on the arbitration bus 16 (time D). ARBSYNC1, like ARBSYNC3, may appear as a single pulse or as a sequence of pulses from various leading users (time F), but only the leading edge of the first appearing ARBSYNC1 pulse is used by the participating users (time D). Each participating user then compares (122) the captured code with the code it was expecting as ARBDATA. If the codes match (124), the user is a "winner" (possibly one of a number of winners) of that cycle and remains a contender in the tournament. If, for a given user, the codes do not match (126), that user has lost in this tournament but may continue to produce sync bus 19 pulses where appropriate for the remainder of the tournament. However, losing users no longer drive ARBDATA (128) on the arbitration bus 16 in the remaining (i.e., the second and third) arbitration cycles in this tournament.

Figure 3B:
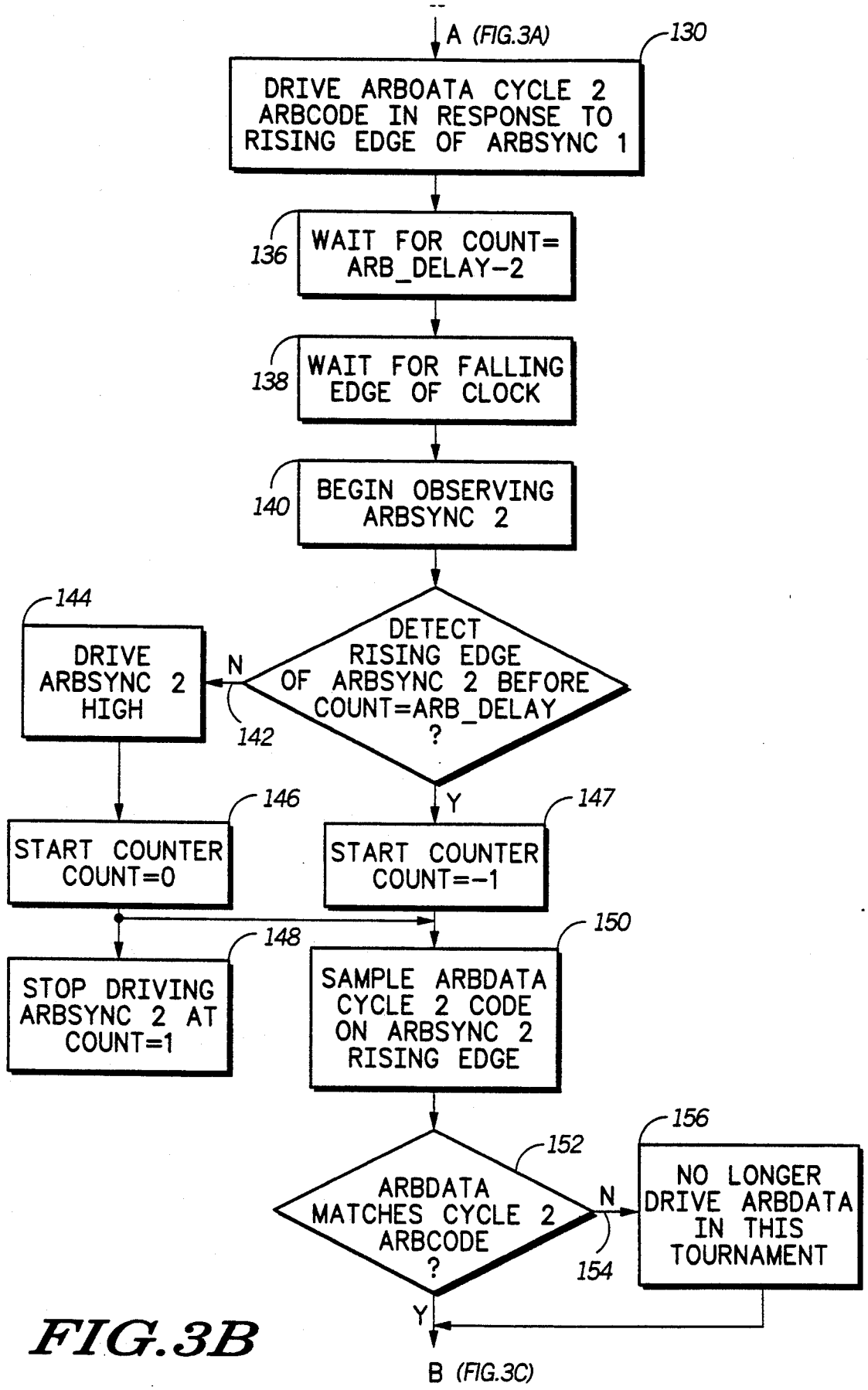

Referring also to FIG. 3b, the second arbitration cycle is similar to the first, except that it is triggered by the rising edge of ARBSYNC1 (time D). Each user 12a-12n remaining in contention in the tournament places its second arbitration code ARBDATA on the arbitration bus lines (130) immediately after receiving the rising edge of ARBSYNC1 (time E) generated during cycle 1. Each participating user 12a-12n (contender or loser) who asserted an ARBSYNC1 pulse begins counting positive edges of its own user clock immediately after asserting ARBSYNC1 (132, FIG. 3a). Other participating users (i.e., those users that did not assert ARBSYNC1) wait until the next rising edge of their internal clock 18 following the rising edge of ARBSYNC1 before beginning to count (14, FIG. 3a). On the next negative transition of the internal clock 18 (138) after the count reaches ARB_DELAY-2 (136) (same value as cycle 1 above), each participating user begins observing (140) the ARBSYNC2 bus line. The first participating user to reach a count of ARB_DELAY (142), without observing a rising edge on the ARBSYNC2 bus line, places a single pulse (144), one user clock pulse in length (146, 148), on ARBSYNC2 at time G. This pulse causes each user 12a–12n remaining in contention in the tournament to again sample (150) ARBDATA on arbitration bus 16 and compare it (152) at time E to the second arbitration code (ARB CODE 2) that it placed on arbitration bus 16. Once again, if for a given user, the codes do not match (154), that user becomes a loser in tournament 1 and no longer drives ARBDATA (156); but the user continues to monitor and supply, if required, sync bus 19 signals for the remainder of the tournament.

Figure 3C:
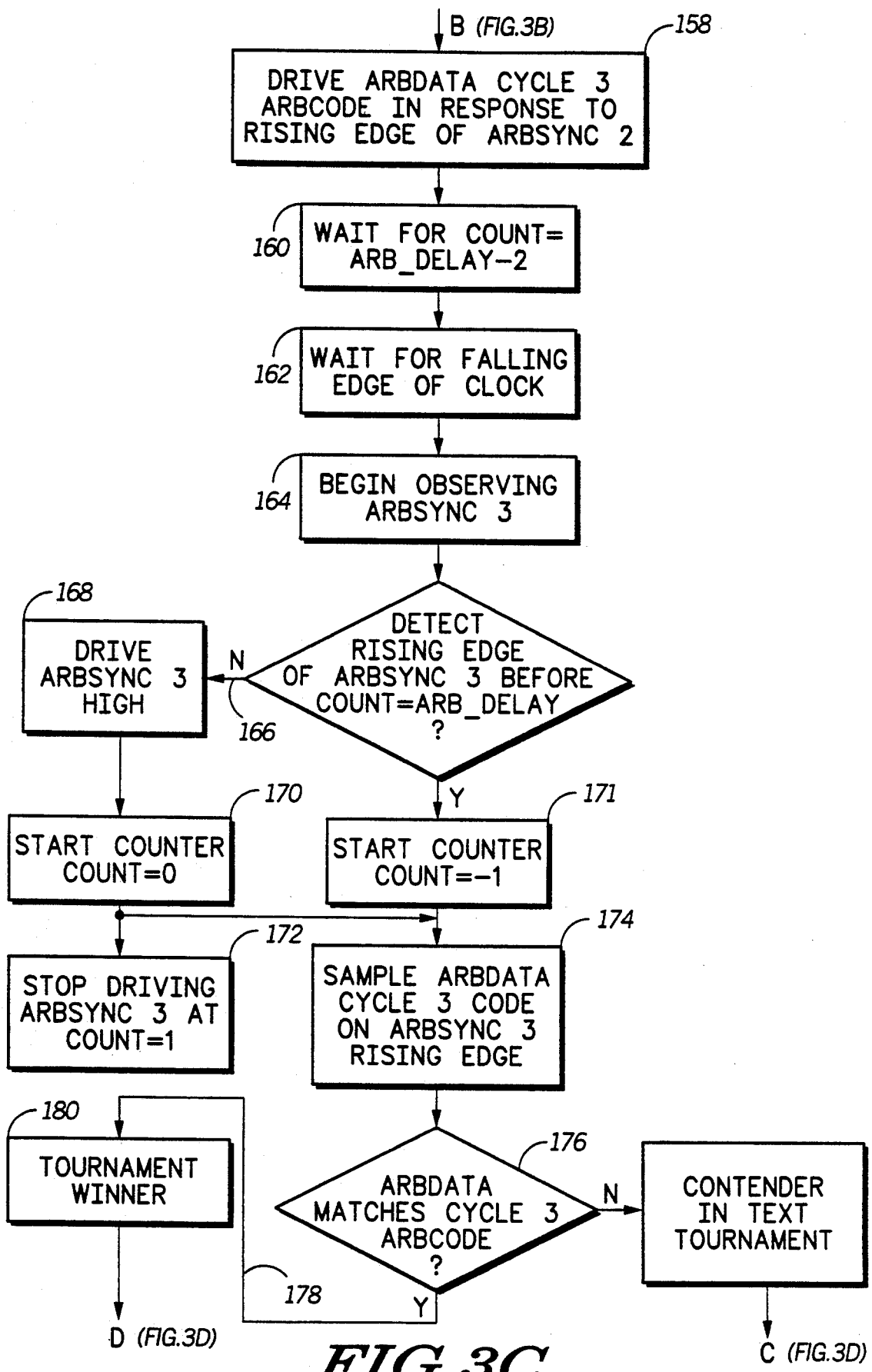

Referring also to FIG. 3c, this process is repeated in the third cycle of the tournament. The third cycle is triggered by the rising edge of ARBSYNC2 (144, FIG. 3b) at time G. Users that remain in contention in the tournament place (158) their third and last arbitration code (ARB CODE 3) ARBDATA on arbitration bus 16. Each participating user (contender or loser) who asserted an ARBSYNC2 pulse begins counting (146, FIG. 3b) positive edges of its own user clock immediately after asserting ARBSYNC2. Other participating users wait until the next rising edge of their internal clocks 18 following observation of the rising edge of ARBSYNC2 before beginning to count (147, FIG. 3b). On the next negative transition of their internal clocks 18 (162) after the count reaches ARB_DELAY-2 (160), all participating users begin observing (164) the ARBSYNC3 line. Every participating user that reaches (166) a count of ARB_DELAY, without observing a rising edge on the ARBSYNC3 line, places (168) a single pulse, one user clock pulse in length (170, 172), on ARBSYNC3 at time I. This pulse causes each user that remains in contention in the tournament to again sample (174) ARBDATA on arbitration bus 16 and compare (176) it to the third arbitration code (ARB CODE 3) that it placed on bus 16 at time G. When all remaining contenders sample ARBDATA, only one will find a code that matches the code expected by the user (178). This user is the tournament winner (180) and will be the next user allowed access to data bus 14 to transmit the data packet in its send buffer 20 or 21 (FIG. 1).

The rising edge of ARBSYNC3 (168) used to capture (174) the third cycle ARBDATA concludes the current tournament (i.e., tournament 1), and also serves to begin the next tournament (i.e., tournament 2). Each user, other than the winner of tournament 1, that has a packet ready to send when ARBSYNC3 rises at time H, becomes a contender in the new tournament (177). The user that won the previous tournament is not a contender in the new tournament, because that user has been granted access to data bus 14 and need not compete until it requires access again, but that user participates in the next ARBSYNC pulse generation to start the next tournament, as described below.

Figure 3D:
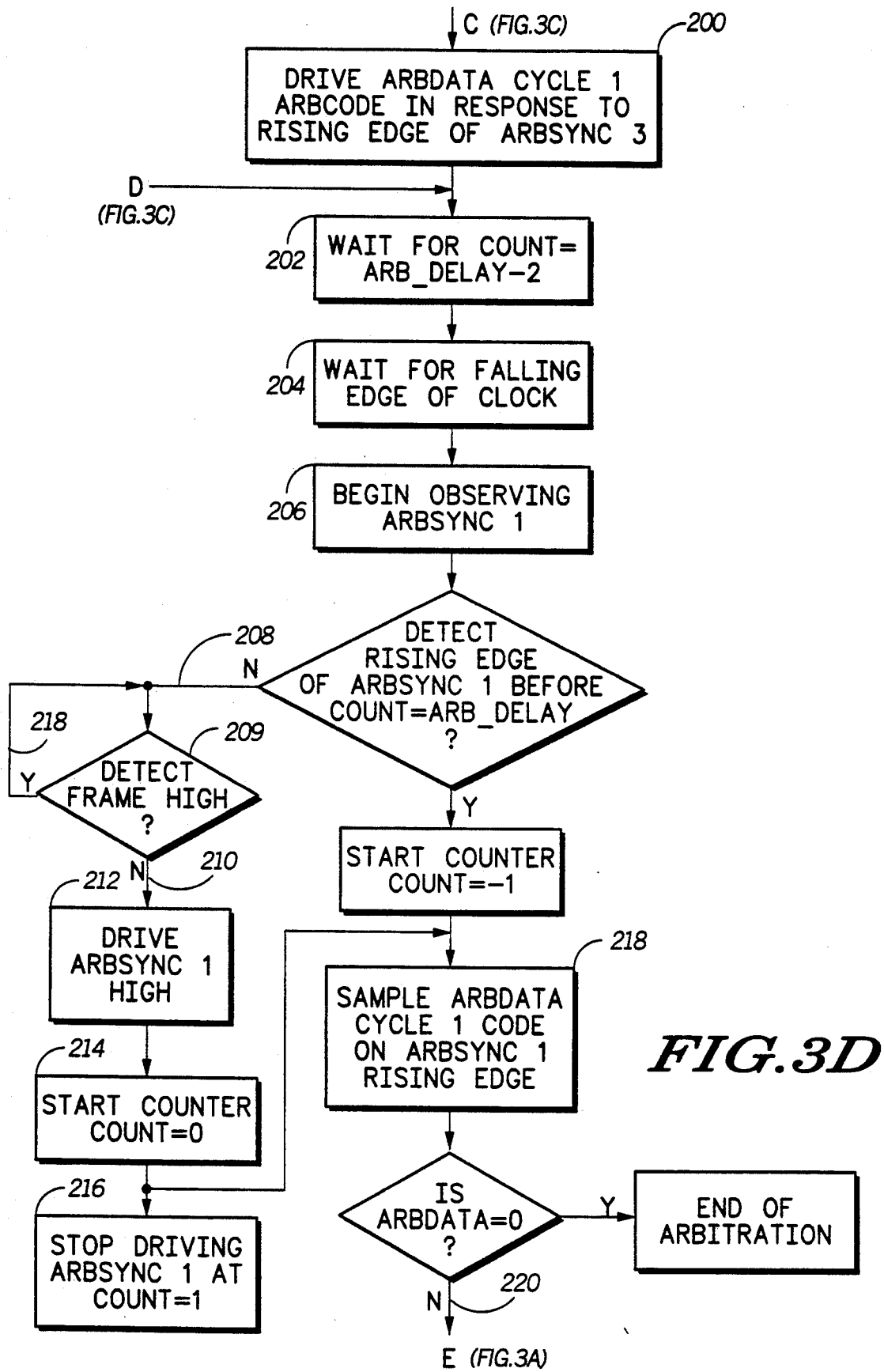

Referring also to FIG. 3d, tournament 2 begins immediately following tournament 1 as long as there are still users that require arbitration. Each user that will contend for access to data bus 14 in tournament 2 responds to the rising edge of ARBSYNC3 (168, FIG. 3c) at time I of tournament 1, by placing (200) its ARBDATA code for cycle I of tournament 2 on arbitration bus 16. The user or users of tournament 1 that asserted ARBSYNC3 at time I (cycle 3, tournament 1) begins counting (170, FIG. 3c) internal user clocks immediately after it asserts ARBSYNC3. All other participating users begin counting their internal user clocks on the next rising clock edge after they detect the ARBSYNC3 pulse (171, FIG. 3c). On the next negative transition of their internal clock (204) after the count reaches ARB_DELAY-2 (202), all participating users begin observing (206) the ARBSYNC1 line. The first participating users to reach a count of ARB_DELAY, without observing (208) a rising edge on the ARBSYNC1 line (with the FRAME line remaining low (210), as discussed below) places (212) a single pulse, one user clock pulse in length (214, 216), on ARBSYNC1 at time J. The winner of tournament 1 then stops participating in the tournament. The ARBSYNC1 pulse causes all tournament 2 contenders to sample (218) ARBDATA on arbitration bus 16 to complete cycle 1 of tournament 2. As long as there are some contenders in tournament 2, ARBDATA will have a non-zero value (220) (the zero value case is discussed below) and the tournament will continue in cycles 2 and 3 (121, FIG. 3a) in the same manner as discussed above for tournament 1.

The ARBSYNC pulse that terminates an arbitration cycle is always generated by the user or users that first reaches the ARB_DELAY count of internal user clock cycles. Such users are called "leading users". Since all user clocks are at about the same frequency, the leading user of one cycle is also likely to be the leading user for the next cycle. It is possible, however, for a faster clock to gradually drift ahead of a slower one, so that the user with the faster clock takes over the role of leading user. Also, if a user drops out of the arbitration (e.g., because it has won a tournament), the role of leading user shifts to another user.

Figure 5:
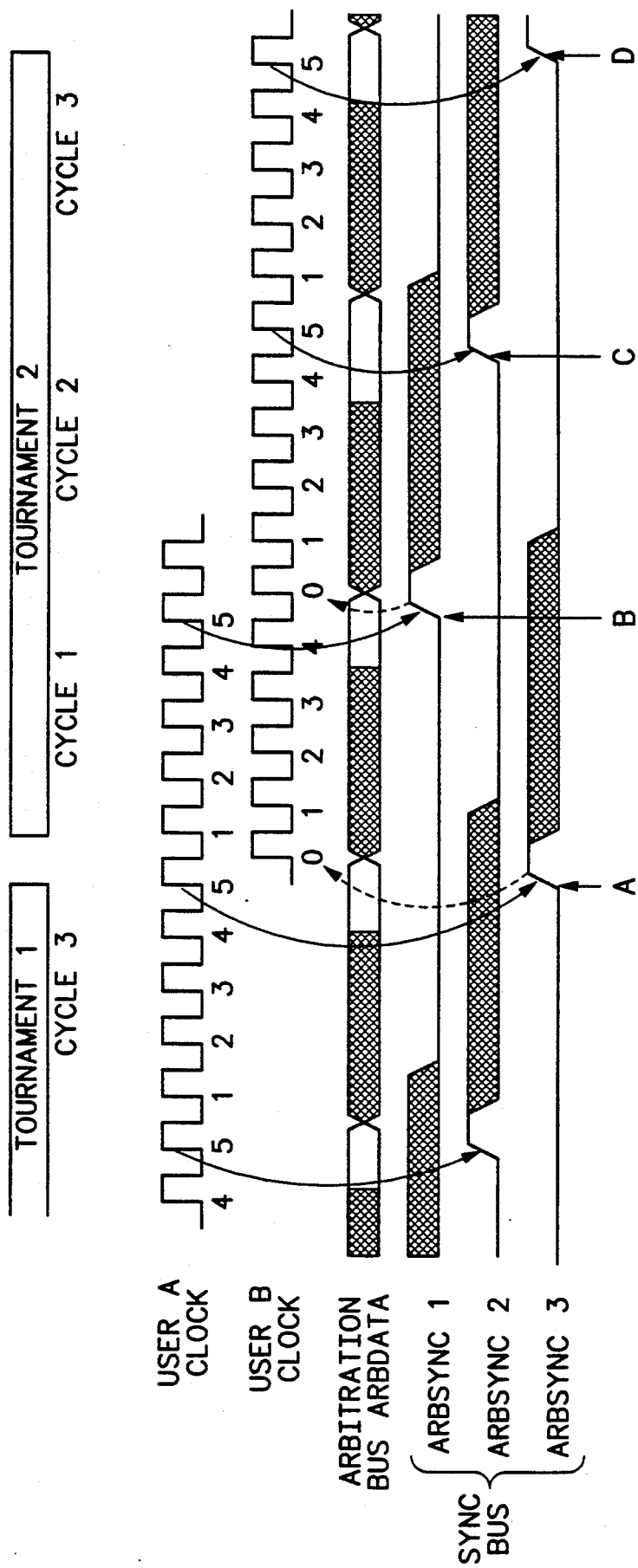
FIG. 5 is a timing diagram showing how arbitration timing may change from one tournament to the next.

Referring to FIG. 5, there is shown an example of the role of leading user shifting from one tournament to the next. During tournament 1, user A is the leading user in each arbitration cycle, so the user A clock is effectively timing the rising edges of the ARBSYNC pulses. All users that participated in tournament 1, including the winner, plus any new users that wish to send a packet, all count clock cycles in the first arbitration cycle of tournament 2. In this example user A is again the first to reach ARB_DELAY so it generates ARBSYNC 1 (at time B).

Now assume that user A was the winner of tournament 1, so A stops participating in tournament 2. ARBSYNC 2 must now be generated by some other user, whichever one is the first to reach a count of ARB_DELAY. In the example, the first turns out to be user B (at time C). User B then continues to be the leading user in tournament 2 (see time D).

Figure 6:
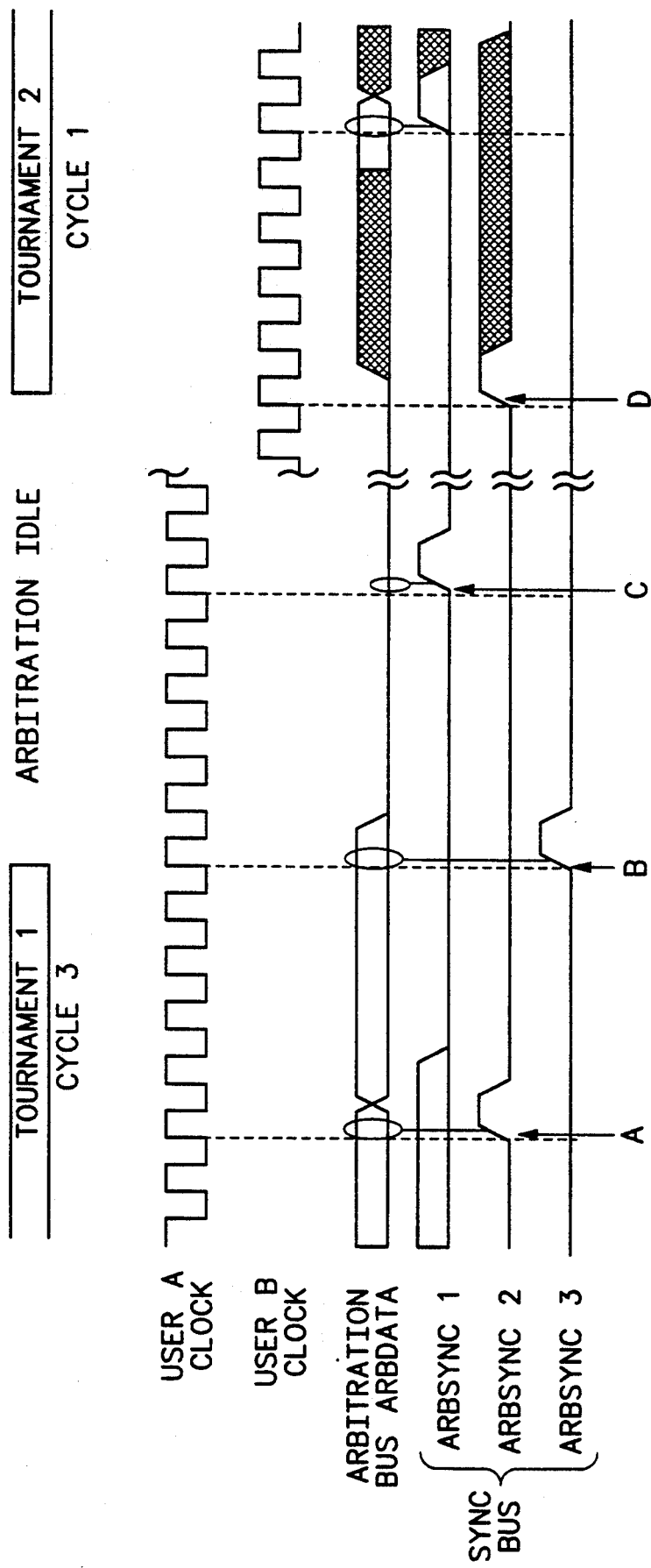
FIG. 6 is a timing diagram showing idle time between the arbitration tournaments of FIG. 4.

Referring to FIG. 6, as discussed above, it is possible to have some idle time between two tournaments. The left side of the figure shows the end of the tournament (e.g., tournament 1) in which only a single user is contending for access to data bus 14. When the single contender obtains access, there are no more users 12a–12n requesting use of the data bus 14, so all arbitration bus 16 lines remain low (i.e., ARBDATA=0). As always, the winning user of tournament 1 continues counting clock cycles after tournament 1 concludes, and ultimately supplies the ARBSYNC1 pulse (time C). Upon receiving the positive edge of this pulse, all users 12a–12n capture the idle state of the arbitration bus. Thus, a source for the ARBSYNC1 pulse is assured, even in the absence of any new contenders or tournament 1 losers to supply this pulse. Upon capturing the idle condition of the arbitration bus lines, all users cease arbitration activity and wait for their send buffers 20 or 21 (FIG. 1) to obtain a new data packet. During the arbitration idle state, any user may start a new tournament by asserting the ARBSYNC3 pulse (time D) as described above.

Figure 7:
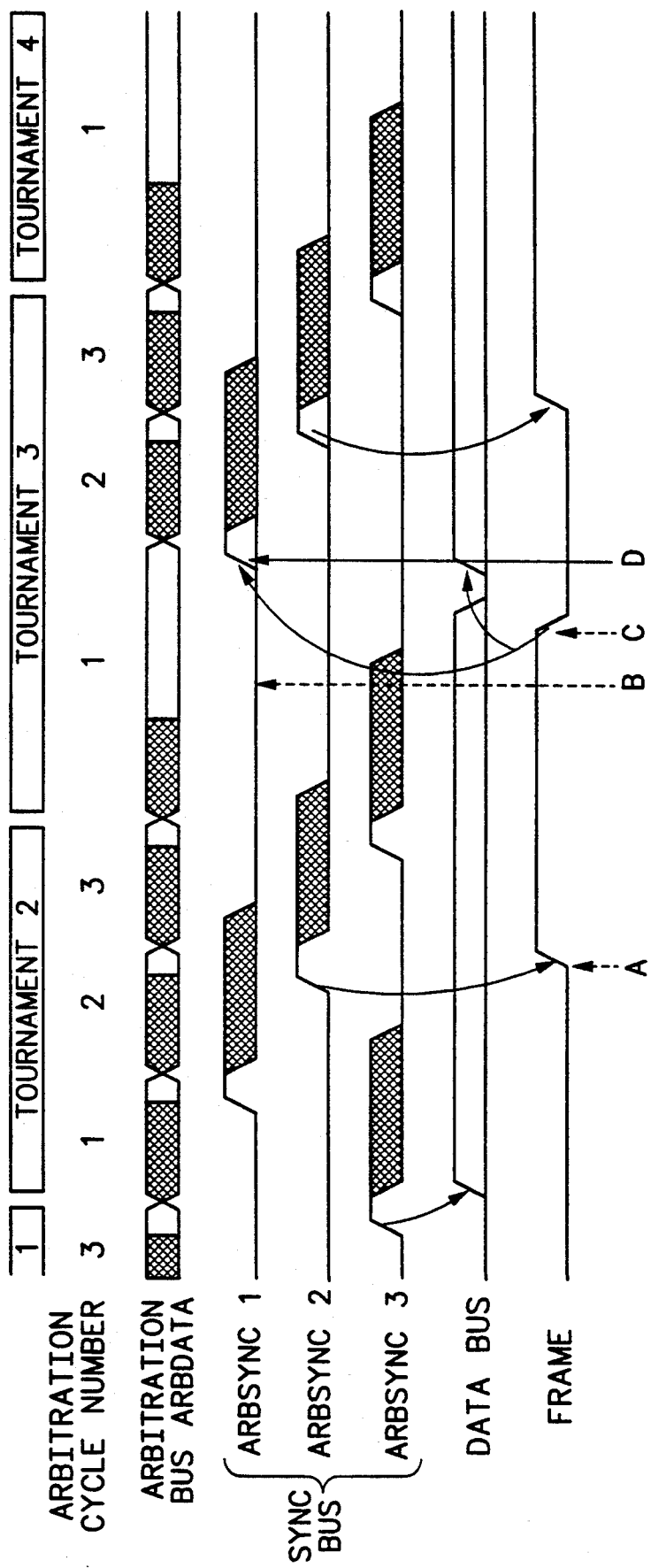
FIG. 7 is a timing diagram showing the suspension of successive arbitration tournaments of FIG. 4.

Referring to FIGS. 3d and 7, arbitration is suspended when necessary by use of the data bus 14 FRAME control line (FIG. 1). Because packet data transmission on data bus 14 usually takes longer than a tournament (FIG. 2), it is often necessary to suspend the start of a second tournament until a current data packet transfer on the data bus is completed. This prevents two or more tournaments from taking place during the same data transfer, which would result in more than one tournament winner concurrently waiting to access data bus 14. Only a single tournament may occur during a given data packet transfer period to assure that only one user is designated to access the data bus when the current data bus access is complete.

When the user accessing data bus 14 detects the presence of a tournament, signified by the rising edge of ARBSYNC2, that user asserts the FRAME control line of data bus 14 (time A in FIG. 7). Each user participating in the next tournament samples (209, FIG. 3d) the FRAME control line on positive edges of its own internal user clock. If FRAME is high (211) when a participating user is about to generate an ARBSYNC1 pulse (time B), that user enters a hold state, suspending arbitration. Therefore, while FRAME is high no users are allowed to complete cycle 1 of the second tournament. Upon completing its current data transfer on data bus 14, the sending user allows the FRAME control line to go low (time C). Upon detecting (210) the low state of the FRAME control line, all arbitrating users resume the tournament operation (time D).

In the examples discussed thus far, the arbitration tournament was three arbitration cycles in length, and three synchronizing lines were used in the sequence: ARBSYNC1, ARBSYNC2, ARBSYNC3. FIG. 18, discussed below, shows an example with only two synchronizing lines, which are pulsed in alternating sequence: ARBSYNC1, ARBSYNC2, ARBSYNC1, ARBSYNC2. More than one synchronizing line is used so that the latest pulses from one arbitration cycle will not be confused with the earliest pulses from the next arbitration cycle. For the scheme to work, there must be a sampling period near the end of each arbitration cycle during which each user can watch for a sync pulse from some other user, while counting toward ARB_DELAY. (In the example described above, this period begins on the negative edge of the user's clock after it reaches a count of ARB_DELAY-2.) All pulses from previous cycles must be over with before this sampling period can begin.

It is possible to perform arbitration with only one synchronizing line, but a longer arbitration cycle time is required The minimum cycle time must include the times given above (i.e., enough time for a signal to travel the length of the backplane, for a user at the far end to respond, and for the signal to travel back and be recognized), plus the length of the sync pulse itself and the length of the ARBDATA sample time at the end of each cycle.

Arbitration Protocol

The individual lines of arbitration bus 16 (ARBDATA0 through ARBDATA4) are configured as wired-OR lines so that any participating user asserting one of the arbitration bus lines (i.e., by placing a logic "1" on the line) will cause each of the other users to detect that assertion. Therefore, an arbitration bus line is low if no participating user asserts it high, but is high if any participating user asserts it high.

Arbitration codes are assigned to users so that after a predetermined number of cycles (e.g., 3 or 4) of applying arbitration codes to arbitration bus lines 16, only one user will remain. This user is the "winner" of the tournament and is permitted to send its data packet on data bus 14 during the next data transfer cycle, as discussed Referring to FIGS. 8 and 10, there is shown a three-cycle tournament using a five-wire arbitration bus 16. Arbitration data lines ARBDATA0-ARBDATA4 (FIG. 1) are the data lines of arbitration bus 16, representing a five bit ARBDATA code word (ARB CODE). Line ARBDATA4 is the most significant bit (MSB) and line ARBDATA0 is the least significant bit (LSB). FIG. 8 is divided into three arbitration cycles and shows the meaning assigned to each arbitration line (bit) for each arbitration cycle. During cycle 1, arbitration data lines ARBDATA0-ARBDATA4 are defined to represent user priorities (i.e., P1 and P2) and groups (G1 and G2), discussed below. During cycles 2 and 3, the arbitration lines are defined to represent pre-assigned arbitration address code bits A9-A5 (i.e., the most significant portion of an arbitration code of FIG. 10) and A4-A0 (i.e., the least significant portion of an arbitration code of FIG. 10) respectively.

Arbitration cycle 1 separates the participating users by priority of the message, P1 or P2. Message priority is determined by each user's send buffers 20 and 2 (FIG. 1) and is dependent on message content and related urgency. There are two message priorities available in this system, a high priority P1 and a lower priority P2. Priority for arbitration is based on two factors: (1) the priority as indicated by message priority signals P1 and P2 and (2) group membership. Group membership is gained by a user when it fails to win a tournament in which no contender was a group member with the same message priority. Group membership is indicated by group priority signals G1 (for P1 messages) and G2 (for P2 messages). During cycle 1, a user with a P1 packet asserts (i.e., places a logic "1") arbitration data lines ARBDATA0, ARBDATA1, and ARBDATA2 (0111) (FIG. 8). Similarly, a user with a priority p2 packet asserts only line ARBDATA0 (0001).

Group G1 users set ARBDATA3 high (1111) and group G2 users set ARBDATA1 high (0011) in addition to their respective P1 and P2 codes. Thereafter in subsequent tournaments, users asserting a G1 signal have priority over those asserting a P1, G2 or P2 signal. Thus, users belonging to group G1 will have priority over all new entrants with the same P1 message priority (i.e., users that are not members of G1) and all users with P2 message priority. Similarly those users asserting a G2 signal have priority over those asserting only a P2 message priority (i.e., users that are not members of G2) signal, yet G2 users still yield to all users asserting either P1 or G1 priority signals. New G1 or G2 groups may be formed after all the current G1 or G2 respective group users have been serviced, thus assuring access to those belonging to a group before granting access to new participating users with the same message priority. In this way all users with the same priority who enter a given tournament together are assured of being serviced before a new user, with the same priority, who attempts to start arbitration after this tournament.

Referring to FIG. 9a, there is shown an example of the arbitration codes asserted by seven users competing for access to data bus 14 during cycle 1 (ARB CODE 1) of each of seven tournaments. The far left column indicates the user number and its corresponding priority. For instance, user 1 has a P1 priority, and user 4 has a P2 priority. During cycle 1 of tournament 1 users 1, 2 and 3 assert their P priority code of 0111 (FIG. 3), and users 4 and 5 assert their priority P2 code of 0001. Users 6 and 7 have not yet requested access to data bus 14 and thus do not participate in tournament 1.

Assume that user 3 wins tournament 1 (e.g., it has the highest user number (A9-A0) among P1 users and therefore gets selected first as per the suggested arbitration assignments described below), thus user 3 does not participate in tournament 2. Users 1 and 2 continue to assert their priority P1 signals. Because they lost tournament 1, and no user had its group bit set in tournament 1, they form a G1 group and assert their G1 code of 1111 during cycle 1 of tournament 2. Similarly, users 4 and 5, the priority P2 losers of tournament 1, form a G2 group and assert their G2 code of 0011 during cycle 1 of tournament 2. Users 6 and 7 vie for access in tournament 2 and thus assert their corresponding priority P1 code (0111) and P2 code (0001) respectively. Because user 6 entered the arbitration contest in a later tournament then users 1 and 2 (same P1 priority), user 6 will always have a lower priority with respect to that of users 1 and 2 (i.e., users 1 and 2 will always get access before 6). The same is true for user 7 with respect to users 4 and 5 (same P2 priority); that is, users 4 and 5 will always get access before user 7.

Assume that user 2 wins tournament 2 and thus does not participate in the next tournament. In tournament 3, user 1 continues to assert its G1 code, users 4 and 5 assert their G2 codes, user 6 asserts its P1 code, and user 7 asserts its P2 code. Once a G1 group is formed, all of its members must be serviced before another G1 group is formed. Thus user 6 cannot be a member of a G1 group unless all members of the G1 group at the time user 6 started arbitration (i.e., users 1 and 2) have been serviced. As with a G1 group, once a G2 group is formed, all of its members must be served before another G2 group is formed. Thus user 7 cannot be a member of a G2 group until all members of the current G2 group are serviced (i.e., users 4 and 5). Therefore user 6 may only assert a P1 code and user 7 may only assert a P2 code at this time.

Assume that user 1 is the winner of tournament 3. Thus, it is apparent that both users 1 and 2, forming group G1 were serviced before the priority P1 user 6.

User 6 wins tournament 4 even though it began arbitrating after the G2 group of packets 4 and 5 was formed. This is apparent from the order of priority (i.e., G1, P1, G2, P2) of FIG. 9. The remaining tournaments 6 and 7 illustrate that the two priority P2 packets, 4 and 5, forming group G2 are serviced before priority P2 packet 7.

Referring to FIG. 9b, there is shown another example of the arbitration codes asserted during cycle 1 of each of six tournaments. Here, five users with P1 message priority packets compete for access to data bus 14. The far left column indicates the user number and its corresponding priority. In particular, this example illustrates how a new group forms after one group finishes (i.e., all users in the group gain access to data bus 14). Group G1 is used here, but the scheme also holds for other groups such as G2.

During cycle 1 of tournament 1, users 1, 3 and 4, all having P1 priority, participate in the tournament. Each asserts its P1 message priority code 0111. Users 2 and 5 have not yet begun to participate.

Assume that user 4 wins tournament 1 (e.g., has highest user number A9-A0 among P1 participants) and does not participate in tournament 2. Users 1 and 3 continue to assert their P1 priority code during tournament 2. Additionally, because they lost tournament 1, and no user had its G1 group bit set in tournament 1, users 1 and 3 form a G1 group and assert their G1 code of 1111 during cycle 1 of tournament 2. New tournament 2 participant user 2 also has a P1 message priority packet, but may not join users 1 and 3 in group G1 since it did not participate in tournament 1 (i.e., the losing participants of which formed group G1). Therefore, user 2 asserts a P1 code of 0111 during tournament 2, and continues to do so until both users 1 and 3 have won a tournament.

Assume that user 3 wins tournament 2, and thus need not participate in tournament 3. During tournament 3, user 1 competes with user 2 and new user 5, also having P1 priority. Once again, user 1 asserts an arbitration code of 1111, indicating G1 membership. Users 2 and 5 both assert codes of 0111, since neither one is a member of group G1.

User 1 wins tournament 3, thus need not participate in tournament 4. Users 2 and 5 participate in tournament 4, along with new user 4. All users have P1 priority packets and each asserts a code of 0111. Since tournament 4 is the first tournament after the tournament in which the last member of the original G1 group won (i.e., user 1 won tournament 3), the losers of tournament 4 will form a new G1 group for tournament 5. That is, the current tournament has no participants asserting G1 membership, and therefore a new G1 group may form for the next tournament. Therefore, although users 2, 4 and 5 began arbitration at different times, (i.e., user 2 in tournament 2, user 5 in tournament 3 and use 4 in tournament 4) they all assert the same 0111 P1 message priority code during tournament 4, and the losers form the same G1 group for tournament 5.

Assume user 5 wins tournament 4, and thus need not participate in tournament 5. Users 2 and 4 form the same G1 group and each continues to assert a code of 1111 until it is serviced (i.e., user 4 wins tournament 5 and user 2 wins tournament 6).

There are additional arbitration cycles in each tournament because, as can be appreciated from the above discussion, multiple users typically "win" during cycle 1. Cycles 2 and 3 are used to "weed out" all but one tournament winner. A series of unique arbitration codes are pre-assigned among users (e.g., based on cardcage slot position) and are applied by the user to the arbitration bus during cycles 2 and 3 to produce a tournament winner.

Referring to FIG. 10 there is shown a table of tournament cycle 2 and 3 codes and their distribution among 36 users. The column labeled A9-A5, correspond to arbitration bits A9-A5 of FIG. 8 (ARB CODE 2). Similarly, the column labeled A4-A0 correspond to arbitration bits A4-A0 of FIG. 8 (ARB CODE 3). The arbitration codes in these two columns form a "marching ones" pattern in each column. Every code is either the same, a subset, or a superset of every other code in its column. Therefore, during a given arbitration cycle, if two or more codes are simultaneously applied to the wired-OR lines of arbitration bus 16, the resulting pattern will always match at least one of the codes applied. There are groups of users with the same A9-A5 (ARB CODE 2) code, but these users have different A4-A0 (ARB CODE 3) codes. Although the arbitration code assignment suggested by FIG. 10 need not be followed exactly, the codes should be related by an identity-subset-superset property so that each arbitration cycle will always have at least one winner.

Also apparent from FIG. 10 is that a priority exists among codes, with user 0 having the lowest priority code and user 35 having the highest priority code. Thus, within a given group, user 35 will always defeat any other users in cycles 2 and 3. The converse is true for user 0. For example, during cycle 2 suers 30-35 (1111) will always be victorious over other remaining users. Conversely in cycle 2 users 0-5 (0000) will always lose to any other users. In cycle 3, users 5, 11, 17, 23, 29 or 35 (1111) will be victorious over any other remaining users because they are the highest priority users of their cycle 2 group (but the presence of any one of these users in cycle 3 mutually excludes the presence of the others).

Hence, if a group of users all desire to arbitrate at the same time and with the same message priority, higher numbered users will win first. Users who begin arbitrating with the same message priority a little later, however, will have to wait for all members of the first group to finish.

Data Transfer Protocol

Referring to FIG. 11, the data bus lines (FIG. 1) are grouped into two segments (corresponding to data buffer A and data buffer B of FIG. 1), each of which includes its own data strobe signal (STROBE A and STROBE B, respectively). The timing for only a single data bus segment and associated strobe is shown in FIG. 11. All the lines of a given segment are attached to the same bus driver device in the sending user and the same bus receiver device in the receiving user in order to limit the skew between the various data bits of a segment and its corresponding data strobe signal caused by variable propagation delays associated with multiple drivers and receivers. Eliminating the skew between the data bus segment and its corresponding data strobe leads to a high data rate capability. In this example, one data bus segment (Data Buffer B) contains seven data bits (D1-D7), while the other data bus segment (Data Buffer A) contains the remaining data bit, D0 (to make a total of eight data bits), the FRAME line, the RATIFY line, and the PARITY line.

Transitions on the data strobe line occur midway through the time period in which data being transmitted on data bus 14 is valid (time A). Thus, the strobe transitions are used by the receiving user to capture that data. The data strobe makes only a single transition per data cycle, and both rising (time A) and falling (time B) transitions are used to strobe data into the receiving buffer. The data strobe line is always returned to its low resting state at the end of a packet. If the data packet contains an odd number of bytes, an extra cycle time is added to the end of the packet to allow the data strobe line to return to its low resting state (time X). Both cases are shown in FIG. 11.

As discussed above, the FRAME line is used to suspend tournaments once a next sender has been selected. The current sender raises the FRAME control line if it detects the start of a second cycle of a tournament (i.e., the rising edge of ARBSYNC2, FIG. 7) which may occur at any time during its data packet transfer (time C). The sender lowers the FRAME control line when it sends the last byte of its packet over the data bus 14 (time E). Another function of the FRAME line is to flag the end of each packet for the receiving user and any tournament winner waiting for data bus 14. Therefore, the sender always raises the FRAME control signal during the next to last byte of a packet (time D) even if it doesn't detect another arbitration, and lowers the FRAME signal on the last byte (time E), to provide a high to low transition on the FRAME control signal at the end of every data packet. A winning user of subsequent arbitration monitors the FRAME control signal and begins its data transfer only after it detects the high to low transition on the FRAME control signal.

The sending user calculates an error detecting parity bit from the data bus data bits and frame control signal bits, and transmits the parity bit along with the data on the PARITY line of data bus 14 (FIG. 1). The parity alternates between odd and even parity, beginning with odd parity, on a data byte by data byte basis. Alternating parity makes clock glitches or out of sync clock edges detectable as parity errors. Also, no collection of stuck data bus lines can satisfy the parity check over the entire data packet.

Referring to FIG. 12, there is shown a timing diagram of sequential data transfers (FIG. 2) over the data bus 14, and the relationship of user clocks among subsequent users of data bus 14. While user A transfers data on data bus 14, subsequent arbitration winner, e.g., user B, samples the FRAME control line on data strobe edges (time A), and looks for a high to low transition on FRAME (time B) indicating the end of the current data transfer on data bus 14. User B then samples data strobe on the rising edge of its own internal user clock (time C) until a low value is obtained, thus assuring user B of control of the data strobe. On the following negative edge of the user B clock (time D), user B begins sending the first byte of its packet on data bus 14.

In order for two users 12a-12n to transfer data packets using this data transfer protocol, their user clocks 18 must be maintained close in frequency. In particular, the user clocks 18 must be close enough in frequency so that, over the course of a maximum-sized packet (e.g., 64 bytes), the skew accumulated between the slowest and fastest user clock 18 is less than ½ the interconnect bit time (i.e., the time taken for a bit to propagate between the two most distant users).

Ratify Protocol

The ratify protocol provides verification to the sender that the packet arrived at the receiver intact. The first byte (word) of each data packet sent over the data bus contains a destination user address. Each user 12a-12n, captures the first word of every packet and examines the address to determine if it is the destination for the packet. Each user is configured to recognize its own unique address, and all users recognize a global broadcast address (as well as multicast addresses). If a user does not recognize the packet address as its own (or as a global address), the user simply ignores the rest of the packet. If the address is a global address or matches the address of a receiving user, the user examines the priority bit (i.e., P1 or P2), which is also in the first byte of the packet, and accordingly directs the packet to the proper receive buffer, 22 or 23 (FIG. 1) corresponding to the packet priority. Receive buffer 22 accepts priority P1 packets while receive buffer 23 accepts priority P2 packets.

Referring to FIGS. 13 and 14, when a user recognizes its own address (or the global or multicast addresses) and begins to receive the packet, it responds by raising the data bus 14 RATIFY line (FIG. 1) at time A. As a packet transfer continues, the receiving user captures each byte of the packet and checks for parity errors. At the end of the packet, if the user detects no parity errors, the user lowers the RATIFY line (time C). Conversely, if the receiving user detects a parity error it holds the RATIFY line for a predetermined period, as discussed below (e.g., from time C to time E), after the end of the packet transmission, before lowering the RATIFY line.

The sending user checks that some user is receiving the packet by looking for a high level on the RATIFY line during packet transfer. This indicates that at least one user has recognized this address as its own and has responded by raising the RATIFY line. If no user responds by raising the RATIFY line, the sender recognizes an error condition and terminates packet transmission.

After the last data byte is sent over data bus 14, the sending user waits a predetermined length of time, programmed in the RATIFY_DELAY register of arbitration controller 17 (FIG. 1), to allow the farthest and slowest user to respond, and samples the RATIFY line again. A low level indicates a successful transfer. If the packet was a broadcast packet to all users (i.e., a global address which all users recognize as their own), their RATIFY line responses appear together (because the RATIFY line is also wired-OR) so that any user can prevent the RATIFY line from going low at the end of the packet if that user received erroneous data.

Timing diagrams FIGS. 13 and 14 show the ratify protocol signals for "long" (FIG. 13) and "short" (FIG. 14) packets from the standpoints of the sending user and the receiving user. The time delays in the ratify protocol are governed by the preprogrammed RATIFY_DELAY control register (FIG. 1) in each arbitration controller 17, which specifies a delay in the range from one to seven user clock cycles. In FIGS. 13 and 14, RATIFY_DELAY is assumed to be preset to 6. FIG. 13 shows the "long" packet case where the data packet sent contains at least twice the RATIFY_DELAY (programmed value) number of bytes (e.g., 13 bytes). FIG. 14 shows the "short" packet case where the number of bytes in the data packet sent (e.g., 4 bytes) is less than twice the RATIFY_DELAY number of bytes. FIGS. 13 and 14 each show the signals twice, once as they appear at the sending user and again as they appear at the receiving user, to show the delay that can exist between them.

Referring to FIG. 13, the RATIFY control line is raised by the receiving user after a number of bytes equal to the value in its RATIFY_DELAY control register (time A) is received, i.e., six bytes. If the entire packet is received without error, the receiving user lowers the RATIFY control line after it receives the last byte of the packet, i.e., the thirteenth byte (time C). If any errors occurred, the receiving user continues to assert the RATIFY control line for another predetermined number of clocks equal to the value programmed in RATIFY_DELAY (until time E). The sending user checks the level of the RATIFY control line at the time that it sends the byte number equal to twice its RATIFY_DELAY, i.e., the twelfth byte (time B). If it is high, the sending user again checks the level of the RATIFY control line after waiting a number of clocks equal to the RATIFY_DELAY value after the last byte of the packet (time D). A low on the RATIFY line indicates receipt of a packet without error. The sender detects a receiving user error if the RATIFY line is still high at this time (time D).

FIG. 14 shows the ratify protocol for a "short" packet (i.e., packet length less than twice the RATIFY_DELAY value). The times at which the receiving user raises the RATIFY control line (time A) and the sending user checks the RATIFY control line for a high value (time B) are the same as in FIG. 13. The falling edge of the RATIFY control line, however, is triggered by a particular internal clock cycle count (i.e., twice the RATIFY_DELAY value) rather than being triggered by the end of the packet being received (time C). Likewise, the time that the sender samples the final RATIFY control line value is at a particular clock cycle count after checking the RATIFY line, (i.e., the value of RATIFY_DELAY) (time D).

FIG. 15 gives a more general view of the RATIFY control line timing from the viewpoint of a sending user. The RATIFY control line signal from one packet can overlap into the beginning of the next packet being sent on the data bus 14 (time B), but does not disturb the values of the RATIFY control line sampled by the sending user (times A and C).

Figure 2:
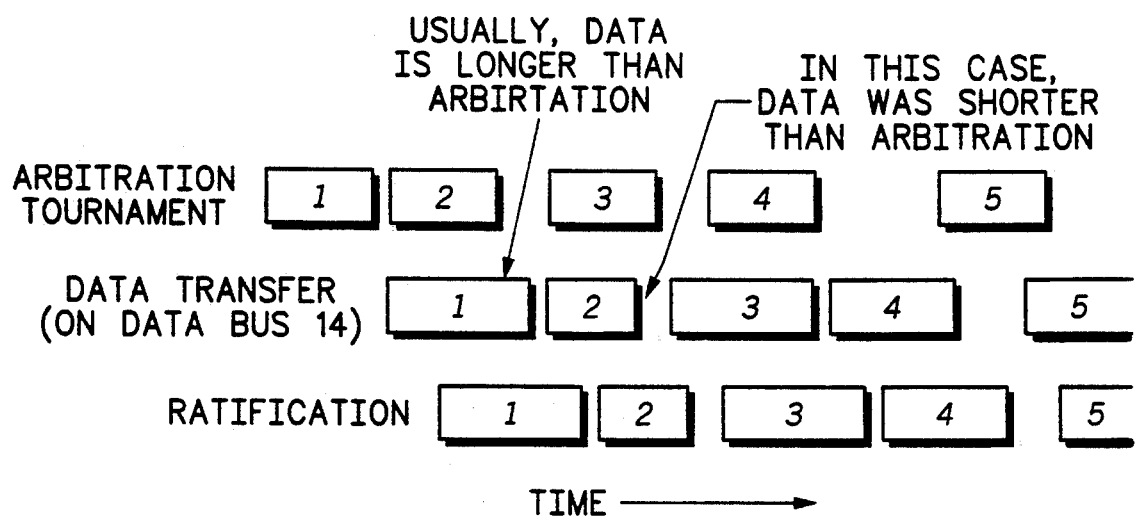
FIG. 2 is a timing diagram showing sequences of arbitration, data transfer, and ratification in the system of FIG. 1.

If short packets are too closely spaced, their RATIFY control line signals could interfere with one another. For instance, a receiving user might raise its RATIFY control line before the sending user of the previous packet has a chance to sample its final RATIFY control line value (FIG. 14, time D). This case is prevented by guaranteeing that packet starts cannot be too closely spaced. The arbitration protocol always spaces packet starts by at least one tournament time (FIG. 2). As long as any tournament time is guaranteed to be longer than the time needed to execute the ratify protocol, there is no problem of overlapping ratifications. Therefore, arbitration controller 17 control registers ARB_DELAY and RATIFY_DELAY (FIG. 1) are programmed such that the number of arbitration cycles multiplied by the length of an arbitration cycle is greater than the length of the ratify protocol.

The importance of this ratify protocol is that the sender knows whether or not a packet transfer is successful. If unsuccessful, the sender has several options such as trying to send the packet again over the same path, or trying a different path.

Alternative Embodiments

Other embodiments are within the scope of the following claims.

The ratify protocol could alternatively be arranged so that a user asserts the ratify line (after reception) if it receives correct data. In this way, the sending user can determine if any user received a transmission correctly. With the ratify protocol depicted in the drawings, the sending user determines if any user received incorrect data.

As is readily apparent from the above discussion, any number of priorities, address schemes, and arbitration code word sizes may be accommodated by adjusting the number of arbitration signals and cycles making up a tournament. For instance, a single arbitration line (1-bit code word) could accommodate $2^n$ users in n arbitration cycles. Similarly, $2^m$ priority levels can be accommodated in m cycles. A single group bit may also be added to track group formation. Such a cycle sequence may be as follows: $P_{m-1}, \ldots, P_1, P_0, G, A_{n-1}, \ldots, A_1, A_0$, where $P_{m-1}-P_0$ represent priority bits, G represents group membership, and $A_{n-1}-A_0$ represent address code bits (i.e., priority is determined first, then group membership, then address).

To reduce the number of arbitration cycles needed, the number of arbitration signal lines can be increased. For example, four priority levels can be handled in one cycle by three lines (using codes 000, 001, 011, 111), instead of one line and two cycles.

When multiple signal lines are used, the arbitration codes can become more complicated. The arbitration sequence involves three types of information: priority, group, and address, in that order. If a given cycle involves more than one type of information (e.g., priority and group, or group and address) then it becomes necessary to provide codes for all possible combinations of the items. In the first cycle of the scheme in FIG. 8, for example, arbitration of two priorities is combined with "group" arbitration. This requires four codes—one for each priority with the group bit on, and one for each priority with the group bit off.

At the opposite extreme from serial arbitration would be completely parallel arbitration. This could be performed with 2×P lines for P priorities with group bit on and off, and with 2×P×A lines for A addresses with all combinations of group and priority.

Referring to FIGS. 16-19, there is shown another embodiment featuring, for example, a four-cycle, two-priority tournament using a three-wire arbitration bus. All packet priority P1 and P2 decisions are made during arbitration cycle 1 (FIG. 16). In the four-cycle tournament, the same G1 and G2 groups are formed as discussed above, but only a single group bit G need be asserted on the arbitration bus during cycle 2 by users belonging to either G1 or G2. Only one group bit is needed in arbitration cycle 2 because priority gets resolved in arbitration cycle 1. Only those users with the winning priority level in cycle 1 drive G with the associated group bit in cycle 2. This results in the identical G1, P1, G2, P2 priority order among packets for either the 3-cycle or 4-cycle tournament.

As shown in FIG. 17, seven bits of arbitration code, A9, A7-A5, A2-A0, are used overall in a "marching one" configuration, allowing for 32 users. The A9 MSB code bit is combined with the G bit and asserted during cycle 2 (FIG. 16). Because group and address arbitration are being combined in the same cycle, codes are provided for all possible combinations. The MSB of the code word represents the logical AND of the A9 and G bits, while the LSB represents the logical OR of the A9 and G bits. Therefore, users with A9=0 and group bit off assert a code of 000. Users with A9=1 and group bit off assert a code of 001. Those with A9=0 and group bit on assert 011, and those with A9=1 and group bit on assert 111. Code bits A7-A5 and A2-A0 are used during cycles 3 and 4 respectively. Because the four-cycle tournament requires fewer code bits than the 3-cycle tournament, bits A8, A4 and A3 (used in the 3-cycle tournament) can be eliminated.

FIG. 18 shows the four-cycle tournament timing diagram. Arbitration timing is shown for an ARB_DELAY value of 3, which leads to a 3 clock per arbitration cycle timing. The timing is identical to the three-cycle case, except only the ARBSYNC1 and ARBSYNC2 sync bus lines are used. Arbitration begins where a user that is ready to send a data packet asserts ARBSYNC2 high (time A). All users wait ARB_DELAY (3 internal clock pulses case) clocks and assert ARBSYNC1 high (if it is still low) to capture the ARBDATA code on arbitration bus 16 (time B). Sync bus assertions subsequently alternate between ARBSYNC2 and ARBSYNC1 as shown in FIG. 18 (times C, D, E and F).

FIG. 19 shows tournament suspension of a four-cycle tournament using the FRAME control signal. As with the three-cycle case, completion of arbitration cycle 2 in tournament 2, as indicated by a rising ARBSYNC2 line (time A), during a current data packet transfer causes the sending user to assert FRAME high (time B). The asserted FRAME control line causes tournament 3 to be suspended (time C) until completion of the current data packet transfer (time D).

Tradeoffs between the number of arbitration signals and the number of arbitration cycles can be seen from the 3-cycle and 4-cycle examples discussed above. If a four-cycle tournament is chosen, fewer arbitration lines need be dedicated to arbitration bus 16 and sync bus 19 functions. However, a four-cycle tournament may prove to be too long if the traffic load contains many packets that are shorter than the 4-cycle arbitration time. For short packets, 3-cycle arbitration would result in less delay between packet transfers (i.e., less idle time on the data bus) due to frequent waits for tournaments to complete.

If a mixture of long and short packets is present, idle time can be reduced by modifying the arbitration protocol to do more "look-ahead". Instead of selecting only one "next sender" during a packet, tournaments could be allowed to continue to select the next two or more senders (at the expense of additional control lines). In this way, extra arbitration time during long packets can make up for insufficient arbitration time during short packets.

Further, the fault tolerant nature of system 10 may be increased by providing a redundant arbitration subsystem. This would involve adding duplicate ARBSYNC lines, arbitration bus lines, data bus lines, and user clocks.

We claim:

1. A method for arbitrating among a plurality of users for access to a shared resource in a system with at least one common wired-OR arbitration-data line connecting all users, and at least one common wired-OR control line connecting all users, in which said users are provided with plesiochronous clocks (clocks generated independently, but at approximately the same rate), comprising:

A) users generating a sequence of at least two control signals on the control line(s), with control signals from different users being combined on the control lines in a wired-OR fashion, and where a time delay before a given user generates a control signal is regulated by the following mechanism:

upon one of generating and receiving a control signal, each arbitrating user waits a predetermined delay time based on cycles of said user's clock, said predetermined delay time being substantially the same for all users, and following this delay time, the user generates a next control signal if it has not already received a next control signal from some other user;

B) subsequently:

B1) users, in response to receiving a control signal, placing an arbitration-data signal on the arbitration-data line(s), where the arbitration-data signals from different users are combined in a wired-OR fashion to form a combined signal, and;

B2) each user, in response to receiving a subsequent control signal, comparing the combined signal appearing on the arbitration-data line(s), to the arbitration-data signal the user placed on the arbitration-data line(s) in B1, and B3) repeating steps B1 and B2 a predetermined number of times.

2. The method of claim 1 wherein each user that arbitrates for said resource, at a time governed by the clock of said user, where selected, transmits a first control signal to inform other users that it will place its arbitration-data signal on the arbitration-data lines, a progression of said arbitration further comprising causing an arbitrating user to refrain from transmitting said first control signal if it has received a said first control signal from another one of said arbitrating users.

3. The method of claim 2 wherein an arbitrating user may successively receive multiple ones of said first control signal, and further comprising causing said arbitrating user to respond only to the first said first control signal that said user receives.

4. The method of claim 3 wherein each said user that transmits a said first control signal does so by asserting a pulse on a first control line, and said arbitrating users respond to a single edge of said pulse.

5. The method of claim 4 wherein said first control line is arranged in a wired-OR configuration between said users and said single edge is an edge of said pulse for which the first control line is asserted from an undriven to a driven state.

6. The method of claim 2 wherein at least one user that arbitrates for said resource transmits a second control signal to cause all users to perform said comparing, and wherein an arbitrating user may successively receive multiple ones of said second control signal, and further comprising causing said arbitrating user to respond only to the first said second control signal that said user receives.

7. The method of claim 6 wherein each said user that transmits a said second control signal does so by asserting a pulse on a second control line, and said arbitrating users respond to a single edge of said pulse.

8. The method of claim 7 wherein said second control line is arranged in a wired-OR configuration between said users and said single edge is an edge of said pulse for which the first control line is asserted from an undriven to a driven state.

9. The method of claim 2 further comprising an arbitrating user performing said comparing when it either generates or receives said second control signal; and determining a result of said arbitration based on results of said comparing.

10. The method of claim 9 wherein said determining comprises at least some of said arbitrating users repeating said steps of placing said arbitration-data signals on said line and performing said comparing in a predetermined number of cycles to determine a user that wins said arbitration.

11. The method of claim 10 further comprising granting said winning user access to the shared resource.

12. The method of claim 11 wherein said resource is a data bus and further comprising permitting said winning user to transmit data over said bus.

13. The method of claim 1, wherein the predetermining number of times of said arbitration comprises a predetermined number of cycles in each of which at least one arbitrating user places its arbitration-data signal on said line(s) and subsequently compares its arbitration signal with a signal appearing on said line(s) to determine a result of the arbitration, and further comprising controlling a progression of said arbitration within each cycle and from a first cycle to a subsequent cycle using control signals generated through the method of claim 1, step A.

14. The method of claim 13 further comprising each arbitrating user determining whether to proceed from the first cycle to a second cycle based on results of said comparing in said first cycle.

15. The method of claim 14 wherein only one said arbitrating user makes a determination to proceed in a final one of said cycles, and further comprising granting said one user access to said shared resource.

16. The method of claim 14 further comprising in each cycle allowing each user that arbitrates for a resource to be capable of transmitting a first control signal at a time governed by the clock of said user to inform other users that it will place its arbitration-data signal on said line, an arbitrating user refraining from transmitting said first control signal if it has received a said first control signal from another one of said arbitrating users, and an arbitrating user placing its arbitration signal on said line when it either generates or receives said first control signal.

17. The method of claim 16 wherein an arbitrating user may successively receive multiple ones of said first control signal during a given cycle, and further comprising permitting said user to respond only to the first said first control signal that it receives in said cycle.

18. The method of claim 16 further comprising in each cycle allowing each user that arbitrates for the resource, where selected, to transmit a second control signal to cause itself and other users to perform said comparing, an arbitrating user refraining from transmitting said second control signal if it has received said second control signal from another one of said arbitrating users, and an arbitrating user performing said comparing when it either generates or receives said second control signal.

19. The method of claim 18 wherein an arbitrating user may successively receive multiple ones of said second control signal during a given cycle, and further comprising permitting said user to respond only to the first said second control signal that it receives in said cycle.

20. The method of claim 18 further comprising each arbitrating user counting in each arbitration cycle a predetermined number of clock cycles generated by its clock after said arbitrating user receives or generates said first control signal and, after said predetermined number is reached, transmitting said second control signal where said user has thus far received only said first control signal from another user.

21. The method of claim 20 wherein a transmission of said second control signal serves to start a second cycle in said arbitration such that each user that has determined to proceed in the arbitration places an arbitration signal on said line.

22. The method of claim 21 further comprising each arbitrating user that receives or generates said second control signal counting a predetermined number of clock cycles and, after said predetermined number is reached, transmitting a third control signal where said user has thus far received only said first and second control signals from at least a first other user.

23. The method of claim 22 further comprising causing each arbitrating user to perform said comparing when it either generates or receives said third control signal, arbitration based on said comparing.

24. The method of claim 13 wherein the transmission of said third control signal serves to start a third cycle in said arbitration and cause each user that has determined to proceed in the arbitration to place an arbitration signal on said line.

25. The method of claim 24 further comprising each arbitrating user that receives or generates said third control signal counting a predetermined number of clock cycles and, after said predetermined number is reached, transmitting a fourth control signal where said user has thus far received only said first, second and third control signals from at least a first other user.

26. The method of claim 25 further comprising causing each arbitrating user to perform said comparing when it either generates or receives said fourth control signal and determine a result of said third cycle of said arbitration based on said comparing.

27. The method of claim 26 wherein said predetermined number of cycles equals three and said fourth control signal serves to start a subsequent arbitration.

28. The method of claim 26 wherein said predetermined number of cycles is greater than three and said fourth control signal serves to start the fourth cycle in said arbitration.

29. The method of claim 1 further comprising
successively performing multiple arbitrations, and controlling a progression of each said arbitration and from one arbitration to a second arbitration using control signals generated through the method of claim 1, step A.

30. The method of claim 29 further comprising each user checking said arbitration-data line(s) at the conclusion of an arbitration and proceeding to a next arbitration only where said line(s) are being utilized.

31. The method of claim 29 further comprising at least one user in each arbitration determining itself a winner of said arbitration based on said comparing, and allowing said at least one user access to said shared resource.

32. The method of claim 31 further comprising said winner signalling other users by asserting the FRAME signal if said winner detects that another arbitration is occurring while said winner is using said resource.

33. The method of claim 32 further comprising said winner releasing said arbitration FRAME signal when it has finished using said resource.

34. The method of claim 33 further comprising said users suspending arbitration during said FRAME signal from said winner, and resuming said arbitration when said signal is released.

35. The method of claim 1 further comprising causing an arbitrating user to determine itself a winner of said arbitration based on results of said comparing, and allowing said winner access to said shared resource.

36. The method of claim 35 wherein said resource is a data path, and further comprising allowing said winning user to transmit data over said data path to at least one destination user.

37. The method of claim 36 wherein said data path comprises a bus that includes multiple data lines, and further comprising causing said winning user to transmit a strobe and data over a portion of said data lines using a common driver, and causing said at least one destination user to receive said strobe and data over said portion of said data lines via a common receiver, whereby skew between said data and said strobe is reduced.

38. The method of claim 36 further comprising causing said at least one destination user to send a first signal to said winner at a first predetermined time after said at least one destination user begins to receive data, and
causing said at least one destination user to send a second signal after a second predetermined time interval if said user determines that correct data was received.

39. The method of claim 38 further comprising causing said winner to monitor said first and second signals from said destination user and determine that an error has occurred where said winner observes only said first signal within a predetermined time.

40. The method of claim 38 wherein said at least one destination user determines said first and second predetermined times by counting a predetermined number of cycles of said clock of said destination user.

41. The method of claim 38 wherein said winning user determines said predetermined time by counting a predetermined number of cycles of said clock of said winning user.

42. The method of claim 38 wherein said at least one destination user sends first and second signals over a wired-OR line having an undriven state interconnected between said users, and said first signal comprises asserting said line to a driven state, and said second signal comprises releasing said line to said undriven state.

43. A method for arbitrating among a plurality of users for access to a shared resource in a system of a kind in which each user arbitrates for access, comprising steps of:
A) each user placing an arbitration signal on an arbitration data path interconnecting the users such that the arbitration-data signals from different users are combined in a wired-OR fashion to form a combined signal, and each user subsequently comparing the combined signal appearing on the arbitration-data path to its placed arbitration-data signal, wherein each user that arbitrates for said resource assigns an initial preference to requests for access in the arbitration based at least on an access priority preassigned to said request for access and on whether said user is a member of a current group of users that is formed at a time during the arbitration when another said group of users is empty, said current group including users that have been denied access as of that time, such that users belonging to said current group will have a higher initial preference in said arbitration than other users that have a same preassigned access priority,
B) each user that arbitrates for said resource arranging at least a portion of its arbitration-data signal as a multibit arbitration-data word having a value that represents said initial preference, and C) each user that arbitrates for said resource arranging at least a portion of its arbitration-data signal as a multibit arbitration-data word having a value that represents said initial preference, and C) each user that arbitrates for access placing its multibit arbitration-data word in parallel on said path, and D) each user that arbitrates for said resource subsequently comparing the multibit arbitration-data word placed in (C) to a combined value of a multibit word that appears on said path, and where the multibit values match declaring said user a winner.

44. The method of claim 43, wherein said arbitration comprises a predetermined number of cycles, and further comprising each user that arbitrates for said resource in a first one of said cycles determining whether to proceed to arbitrate in a next cycle based on results of said comparing in the first cycle, and each user that proceeds to arbitrate for said resource in said next cycle placing a second multibit arbitration-data word in parallel on said path and repeating said comparing and determining steps.

45. The method of claim 44 wherein each user's second multibit word may be different from the multibit word produced by said user during said first cycle.

46. The method of claim 44 wherein during at least one of said cycles each user places on said path a multibit word that represents an identification of said user in the system and has a value that represents a second preassigned access priority related to said identification.

47. The method of claim 46 wherein said multibit words that represent identification of said users are binary words arranged to have marching ones values according to the respective identification of said users.

48. The method of claim 46 wherein each user's multibit word that represents identification has a value based at least in part on whether said user is a member of said current group.

* * * * *

UNITED STATES PATENT AND TRADEMARK OFFICE
CERTIFICATE OF CORRECTION

PATENT NO. : 5,263,163

DATED : Nov. 16, 1993

INVENTOR(S) : Craig S. Holt, Joseph Keren-Zvi, and Lloyd A. Hasley

It is certified that error appears in the above-identified patent and that said Letters Patent is hereby corrected as shown below:

At column 25, line 13, insert after "signal," --and determines a result of said second cycle of said--.

At column 25, line 14, "claim 13" should be --claim 23--.

At column 27, lines 1-4, delete "C) each user that arbitrates for said resource arranging at least a portion of its arbitration-data signal as a multibit arbitration-data word having a value that represents said initial preference, and".

Signed and Sealed this

Twelfth Day of July, 1994

Attest:

BRUCE LEHMAN

Attesting Officer

Commissioner of Patents and Trademarks